(12) United States Patent
Panchal et al.

(10) Patent No.: US 11,184,084 B2
(45) Date of Patent: Nov. 23, 2021

(54) SYSTEMS AND METHODS FOR PROVIDING NETWORK ACCESS TO AIRCRAFT

(71) Applicant: Verizon Patent and Licensing Inc., Arlington, VA (US)

(72) Inventors: Jignesh S. Panchal, Hillsborough, NJ (US); Michael Kondratiuk, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 102 days.

(21) Appl. No.: 16/693,791

(22) Filed: Nov. 25, 2019

(65) Prior Publication Data

US 2021/0159971 A1    May 27, 2021

(51) Int. Cl.
*H04B 7/185*    (2006.01)
*G08G 5/00*    (2006.01)
*G05D 1/10*    (2006.01)

(52) U.S. Cl.
CPC ......... *H04B 7/18506* (2013.01); *G05D 1/101* (2013.01); *G08G 5/003* (2013.01); *G08G 5/0004* (2013.01); *H04B 7/1855* (2013.01)

(58) Field of Classification Search
CPC ................................................. H04B 7/18506
See application file for complete search history.

(56) References Cited

U.S. PATENT DOCUMENTS

| | | | | |
|---|---|---|---|---|
| 9,763,146 | B2* | 9/2017 | Tietz | H04B 7/155 |
| 9,813,969 | B2* | 11/2017 | Axmon | H04W 4/42 |
| 10,547,373 | B2* | 1/2020 | Axmon | H04B 7/18519 |
| 10,609,546 | B2* | 3/2020 | Panchal | H04W 76/12 |

OTHER PUBLICATIONS

3GPP TS 38.306 V15.7.0, "3rd Generation Partnership Project; Technical Specification Group Radio Access Network; NR; User Equipment (UE) radio access capabilities (Release 15)," Sep. 2019.
3GPP TS 38.321 V15.7.0, "3rd Generation Partnership Project; Technical Specification Group Radio Access Network; NR; Medium Access Conlrol (MAC) protocol specification (Release 15)," Sep. 2019.
3GPP TS 38.331 V15.7.0, "3rd Generation Partnership Project; Technical Specification Group Radio Access Network; NR; Radio Resource Conlrol (RRC) protocol specification (Release 15)," Sep. 2019.

* cited by examiner

*Primary Examiner* — Michael A Berns

(57) ABSTRACT

A system described herein may generate a map of ground stations and associated antenna beams along a flight path. Such map generation may include assigning a unique identifier to each antenna beam and associating an absolute or relative location to each beam. As an aircraft traverses the flight path, the map may be utilized to identify candidate serving ground stations and/or candidate antenna beams, whereby a likelihood of selection may be generated for each adjacent beam to a serving beam. The likelihood of selection may be calculated based on one or more predicted flight paths and associated confidence levels of the predicted flight paths. Flight paths may be predicted based on serving beam history, pre-defined flight path, and/or other relevant factors.

20 Claims, 14 Drawing Sheets

Map of Antenna Beams (Aerial View)

Adjust Weighting Pattern based on Predicted Path of Aircraft

SYSTEMS AND METHODS FOR PROVIDING NETWORK ACCESS TO AIRCRAFT

BACKGROUND

Travelers accessing a wireless network may access various network-based resources. With the advent of Next generation systems, such as Fifth Generation ("5G") wireless networks, accessing such network-based resources from an aircraft may be difficult, resource, power and time intensive.

DETAILED DESCRIPTION OF THE PREFERRED EMBODIMENTS

Figure 1A:
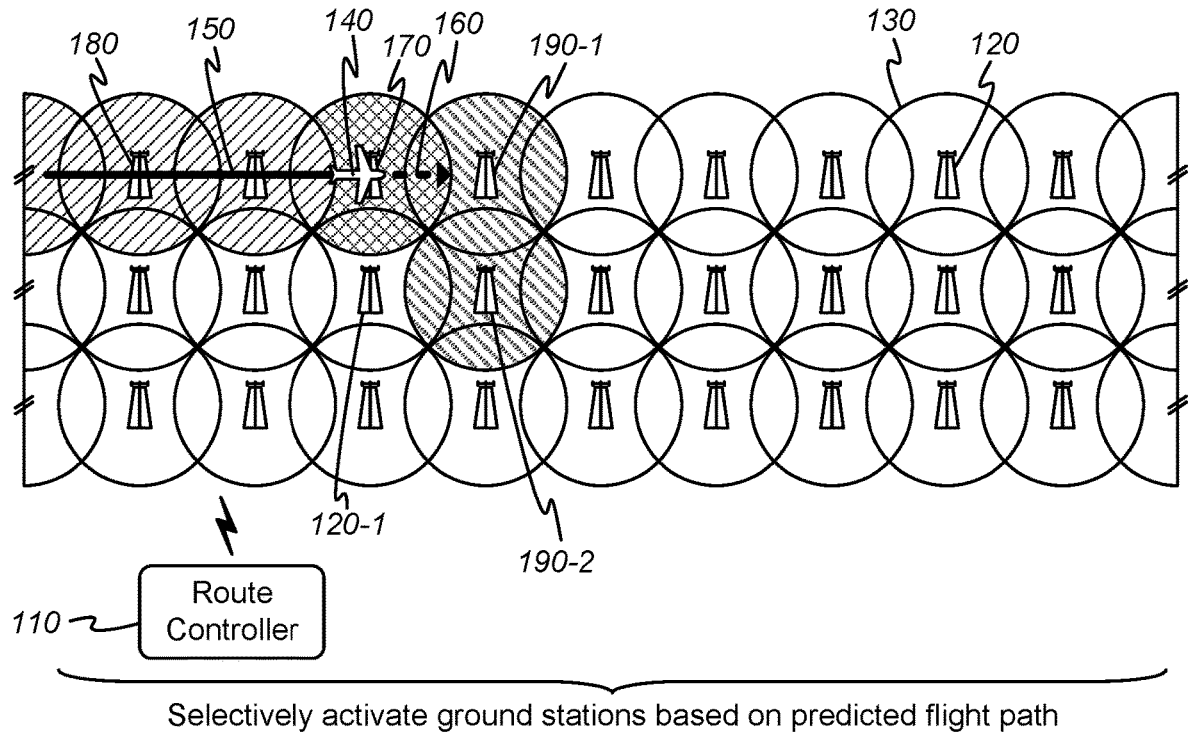
FIGS. 1A-1D illustrate the selective activation and deactivation, in accordance with embodiments described herein, of ground stations that provide network connectivity to an aircraft, based on a predicted path of the aircraft.

The following detailed description refers to the accompanying drawings. The same reference numbers in different drawings may identify the same or similar elements.

Embodiments described herein provide a system that provides network connectivity to aircraft and other airborne vehicles, and/or devices located in or on an aircraft (e.g., an airplane, jet, drone, unmanned aerial vehicle, balloon, blimp, dirigible, rocket, spacecraft, or any other device able to travel through the atmosphere), during operation of the aircraft (e.g., while the aircraft is in flight). Such connectivity may be provided via a set of ground stations placed such that communication coverage is provided along a complete flight path of the aircraft. Each ground station may include radio transmitters and/or receivers that are able to communicate with radio transmitters and/or receivers on aircraft (e.g., radio sub-systems of the aircraft, and/or user equipment ("UEs") located on the aircraft, such as smartphones, tablets, or the like). In addition, each ground station may be able to connect to various networks, including the Internet. The ground stations provide network connectivity to aircraft (and/or devices on the aircraft) via the radio transmitters and/or receivers. During communication between ground station and aircraft, the ground station may vary transmission gain such that signal quality and service level is maintained across varying distance.

Some embodiments may include one or more antenna arrays at each ground station. The antenna arrays may provide an aerial coverage area, and multiple ground stations may be arranged such that partially overlapping, abutting, or adjacent aerial coverage areas may combine to form a system coverage area (e.g., an area along a flight path). Each antenna beam (and associated aerial coverage area) may be able to form a communication link to an aircraft and act as a serving beam. The antenna beams associated with the multiple ground stations may be mapped to an array of locations such that antenna beams adjacent to the serving beam may be identified.

As an aircraft moves along a flight path, as each serving beam is identified or selected (i.e., when a communication link is established), some embodiments may identify one or more candidate handoff beams based on predicted movement of the aircraft. Each candidate handoff beam may be associated with a probability, measure of confidence, and/or some other metric that indicates a likelihood that the candidate handoff beam will be located along a flight path of a given aircraft. In accordance with some embodiments, candidate handoff beams may be activated as a handoff is anticipated, based on the flight path (or an estimated flight path) of the aircraft. In addition, based on the probability of handoff to a particular candidate beam, the transmission power (or another appropriate attribute) of the transmitter associated with the particular candidate beam may be varied. For instance, candidate beams with a higher probability of selection may be operated at higher power than candidate beams with a lower probability of selection. Such an approach may more efficiently utilize available power than broadcasting all beams at full power. Transmitters associated with candidate beams having a probability that is less than a threshold value may be deactivated.

A similar approach may be applied to ground stations, whereby each ground station along a flight path may be activated and deactivated based on current location and a predicted or anticipated path of an aircraft. As the aircraft approaches a boundary between ground stations, a set of candidate ground stations may be identified. Such candidate ground stations may be identified based on association with the identified candidate beams. Candidate ground stations may be powered on or activated when a handover probability exceeds a threshold value. Likewise, candidate ground stations may be powered down or deactivated when a handover probability does not exceed the threshold value.

Some embodiments may predict aircraft path based on serving beam information, serving ground station information, information supplied by the aircraft (e.g., location, heading, speed, etc.), information received from and/or otherwise associated with UEs onboard the aircraft (e.g., subscriber information associated with one or more UEs that have been identified as being located on the aircraft), and/or other relevant information (e.g., weather information, air traffic information, etc.). For instance, some embodiments may predict aircraft path by analyzing historical serving beam information and estimating a path based on previous and current location of the aircraft (e.g., if a plane moves from a first serving beam that is due east of a second serving beam, a path prediction component may determine that the plane is heading west and generate a path prediction based on the determined heading). Such historical prediction may utilize multiple previous locations to predict a path (e.g., by refining heading information as additional serving beams are selected). In some embodiments, for instance, a path prediction component may determine that aircraft that utilize a certain set of serving beams (e.g., a set of serving beams that are located in one city, while the aircraft travels west) typically utilize a second set of serving beams (e.g., a set of serving beams that are located in another city that is west of the first city).

For example, as shown in the aerial view of FIG. 1A, a route controller 110 may be able to interact with multiple network-connected ground stations 120, each having an associated coverage area 130, in order to provide network connectivity to one or more aircraft 140 travelling through or near the array of coverage areas 130 formed by the multiple ground stations 120.

Route controller 110 may be a device that is able to communicate with each ground station 120. Route controller 110 may estimate or predict a flight path of aircraft 140. Route controller 110 may identify handoff candidate ground stations and send activation messages to such candidates. Likewise, route controller 110 may send deactivation messages to previously active ground stations after a handoff has completed to ensure efficient operation.

Each ground station 120 may include a radio with a receiver and/or a transmitter. The radio may be associated with one or more antenna arrays (e.g., a receiving array and a transmitting array). In this example, the receiving area and the transmitting area may be the same (and/or may use the same antenna array) and may together provide coverage area 130. Each ground station 120 may be in communication with multiple aircraft 140 at a given time or may not be connected to any aircraft at a given time. In addition to communicating with aircraft 140, each ground station 120 may be able to communicate with other ground stations.

One or more ground stations 120 may provide access to various networks or other resources (e.g., the Internet, cellular networks, etc.) in some embodiments. Such access may be provided using various appropriate networks, interfaces, or communication channels (e.g., wired connections and networks, wireless or cellular networks, distributed networks, etc.).

In this example, each ground station 120 has a circular coverage 130 and the ground stations 120 are arranged in an array of rows and columns. Different embodiments may include differently shaped coverage areas 130 (e.g., oval, round, rectangular, hexagonal, etc.) that may be arranged in various different configurations to provide a desired overall coverage area. As shown, some embodiments may include coverage areas with overlapping portions such that an overall coverage area with no gaps is provided.

In some embodiments, gaps in the overall coverage area may occur due to geographical barriers (e.g., Federal land preserves). Some embodiments may utilize satellites or other airborne platforms to provide coverage across the full overall coverage area with no gaps. Some embodiments may adjust the configuration and/or operation of ground stations 120 that are near or adjacent to such gaps (e.g., by increasing radio power, increasing horizon angle, etc.).

Each ground station 120 is located at the center of the associated coverage area 130 in this example, but different embodiments may include ground stations 120 located at different positions within or near the coverage area 130. Arrangement of ground stations 120 (and associated coverage areas 130) will be described in more detail in reference to FIG. 5 below.

As shown, aircraft 140 moves along flight path 150 that passes through coverage areas 130 associated with multiple ground stations 120. As each active communication link is established between a ground station 120 and aircraft 140, a list or history of previously active ground stations may be updated. The history of previously active ground stations may include information such as a unique identifier associated with each ground station, location of each ground station, time a communication link was established, time the communication link was terminated, link quality data, and/or other relevant information. In addition, some embodiments may generate a list of candidate ground stations (whether selected or not), previous path predictions (and associated accuracy of the predictions as compared to actual flight path, etc.).

Some embodiments may generate a predicted path 160 based at least partly on attributes of a serving ground station 170, attributes of one or more previously identified serving ground stations 180, and attributes of one or more candidate ground stations 190-1 and 190-2. As discussed below, other information (e.g., information associated with aircraft 140) may be used to generate predicted path 160. Such attributes may include, for instance, location or position of each ground station 120 and/or associated coverage area 130 (e.g., as specified using GPS coordinates). As another example, such attributes may include relative position or location (e.g., each ground station 120 may be associated with a list of adjacent or nearby ground stations). Such associations may include directional or other attributes that may define positions of adjacent or nearby ground stations 120 relative to the associated ground station (e.g., North, Northeast, East, etc. may be used to specify the relative positions in this example).

In some embodiments, connected aircraft 140 may communicate location, heading, and/or speed information at regular intervals such that the expected path of aircraft 140 are known to a great certainty. Predicted path 160 may be based at least partly on such information provided by aircraft 140 or other resources (e.g., route controller 110). In addition, some embodiments may utilize information such as a planned flight path or destination information for path prediction, if available.

In some cases, aircraft 140 may not provide any location or path information, and route controller 110 may generate predicted path 160 by estimating a location and path based on previous serving ground station 170 location(s) (and/or serving beam location(s)), triangulation based on received signal strength (or other appropriate attribute such as response delay) among multiple ground stations 120 or antenna beams of one or more ground stations 120, and/or other appropriate information or algorithms. An example of such location determination and path prediction will be described in more detail in reference to process 1400 below.

In some embodiments, predicted path 160 may be based at least partly on historical information and/or machine learning techniques. For instance, if a majority of aircraft 140 that utilize a first ground station 120 as a serving ground station 170 subsequently utilize a second ground station 120 as a serving ground station 170, predicted path 160 may be associated with a higher probability of passing through the coverage area associated with the second ground station 120.

In this example, predicted path 160 is represented as a single path. Some embodiments may generate multiple predicted paths, each path associated with a probability or weight. As another example, some embodiments may specify a path prediction using a vector, spread angle, and relative probability associated with any path or location within the spread angle (e.g., paths farther from the vector may be associated with lower probability of use).

In some embodiments, each ground station 120 may be associated with multiple antenna beams. Path prediction may be further refined based on identification of a current serving beam and a history of previously serving beams. Such beam-level prediction will be described in more detail in reference to FIG. 3A-FIG. 4B.

In the example of FIG. 1A, aircraft 140 has followed a straight-line path 150 with previous serving station 180 and current serving station 170 located along the same row of the array of coverage areas 130. As such, predicted path 160 indicates an expectation that aircraft 140 will continue along the same heading. Such a prediction in this example may be associated with a relatively high probability or confidence level. In this example, two candidate ground stations 190-1 and 190-2 are identified based on predicted path 160 and associated confidence level.

One or more of candidate ground stations 190-1 and/or 190-2 may be activated (e.g., by sending an expect handoff message from route controller 110 and/or serving ground station 170 to candidate ground stations 190-1 and 190-2) as aircraft 140 approaches a boundary of coverage area 130 associated with current serving station 170 (and/or based on other appropriate criteria such as signal quality, distance, etc.).

Some embodiments may activate all candidate ground stations regardless of predicted likelihood of use. Some embodiments may activate only those candidate ground stations that exceed a threshold predicted likelihood of use (e.g., greater than twenty-five percent). Some embodiments may activate only the ground station with the highest predicted likelihood of use. Depending on the number of candidate ground stations that are identified, a sub-set of candidates may be activated that are expected to provide a desired level of service quality.

Depending on performance associated with an active candidate ground station 190-1 or 190-2, some embodiments may activate additional candidate ground stations, regardless of a probability of use associated with predicted path 160. For instance, if some measure of signal quality (e.g., signal to noise ratio ("SNR"), received signal strength, transmission delay, etc.) does not exceed a threshold level, additional candidate ground stations may be activated and evaluated even when predicted probability of use is below a target threshold.

In the example of FIG. 1A, the set of candidate ground stations includes ground stations 190-1 and 190-2, while adjacent ground station 120-1 is not identified a candidate (but may become a candidate depending on evaluation of the identified candidates, as described above). Based on the predicted path 160, candidate ground station 190-1 may be associated with a higher probability of selection than candidate ground station 190-2. Some embodiments may adjust attributes of the candidate ground stations based on predicted likelihood of use (e.g., candidate station 190-1 may be operated at full power while candidate station 190-2 is operated at reduced power). Such attribute adjustment and candidate weighting will be described in more detail below in reference to the antenna beam arrays of FIG. 11A and FIG. 11B.

Figure 1B:
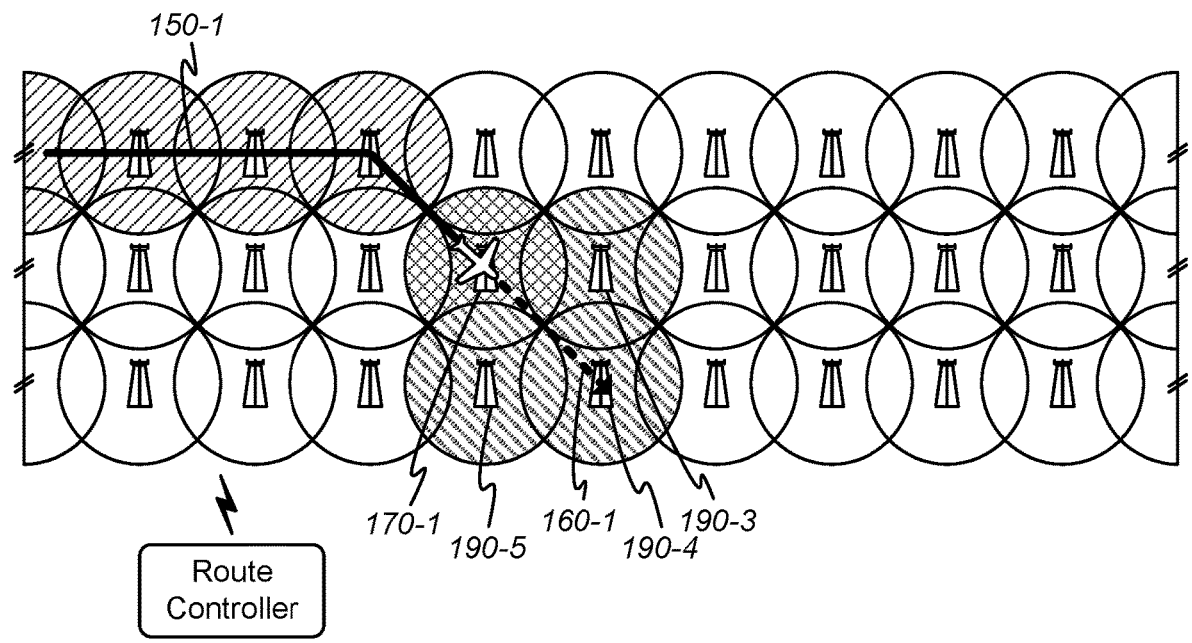

FIG. 1B continues the example of FIG. 1A, where aircraft 140 is now served by serving ground station 170-1 (formerly candidate ground station 190-2). As shown, actual path 150-1 has deviated from previously predicted path 160. In this example, route controller 110 may not have access to information regarding aircraft 140 (e.g., location and/or heading) and may generate a predicted path 160 based on the serving station history. Thus, updated predicted path 160-1 may be generated after aircraft 140 establishes an active link with serving station 170-1 (i.e., route controller 110 may not recognize that aircraft 140 has deviated from previous path 150 until a candidate ground station is selected as the serving ground station 170-1).

The communication link between aircraft 140 and previously-serving ground station 170 may be closed, terminated, torn down, etc., using appropriate protocol(s) (e.g., a handover completion message may be sent to ground station 170, which may cause ground station 170 to cease communicating with aircraft 140). In addition, once the active link with ground station 170-1 is established, previously active ground station 170 may be deactivated or powered down. After the handoff has completed, original serving ground station 170 has been deactivated (e.g., powered down, or placed in a low-power state).

As shown, in this example predicted path 160-1 is associated with three candidate ground stations 190-3, 190-4, and 190-5. As predicted path 160-1 passes near a boundary between three adjacent candidate ground stations 190-3-190-5, candidate ground station 190-4 may be identified as having the highest likelihood of selection, while candidates 190-3 and 190-5 may have roughly equal likelihoods of selection that are less than the likelihood of selection of ground station 190-4.

Figure 1C:
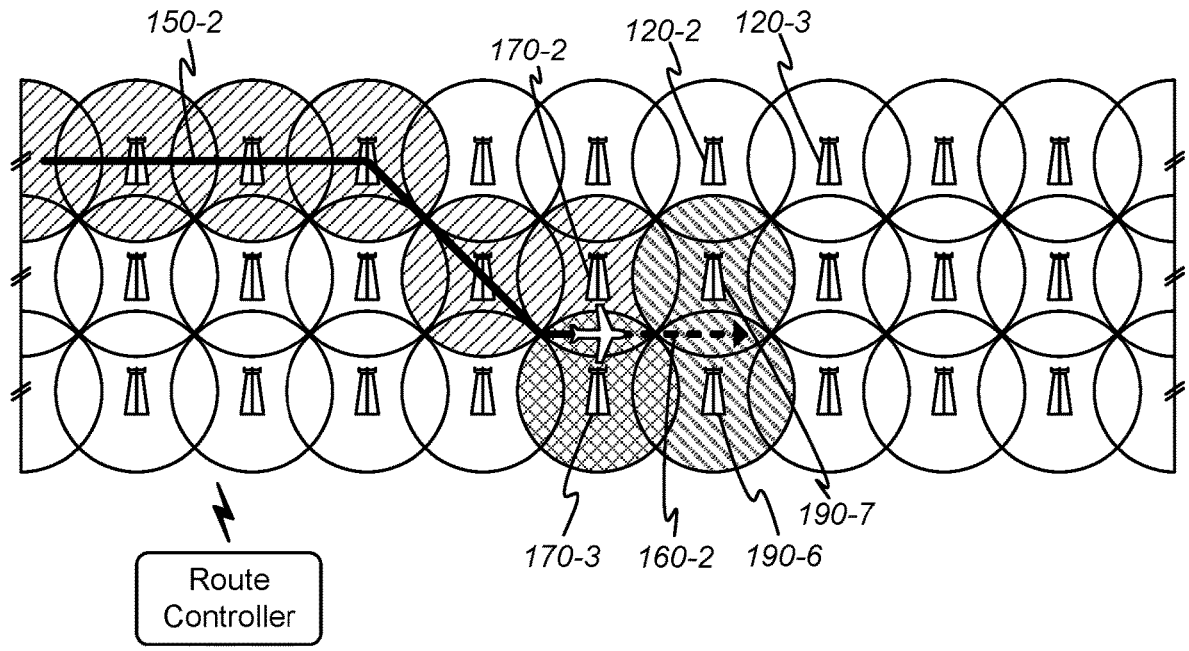

FIG. 1C continues the example of FIG. 1A and FIG. 1B, where aircraft 140 is associated with current serving ground station 170-3 after having previously utilized ground station 170-2 as a serving ground station. As above, previously serving ground stations 170-1 and 170-2 may be deactivated once a handover to a candidate ground station is completed. In this example, path 150-2 passes along a boundary between the two stations 170-2 and 170-3, where each may act as the active or serving station at some point along path 150-2 (where a current serving station may be selected based on comparison of link quality or some other appropriate criteria). Predicted path 160-2 may be updated each time aircraft 140 switches between ground stations 170-2 and 170-3. In this example, candidate ground stations 190-6 and 190-7 may have roughly equal predicted likelihood of selection. As above, only the identified candidate ground stations 190-6 and 190-7 may be activated as aircraft 140 approaches a handover boundary.

Figure 1D:
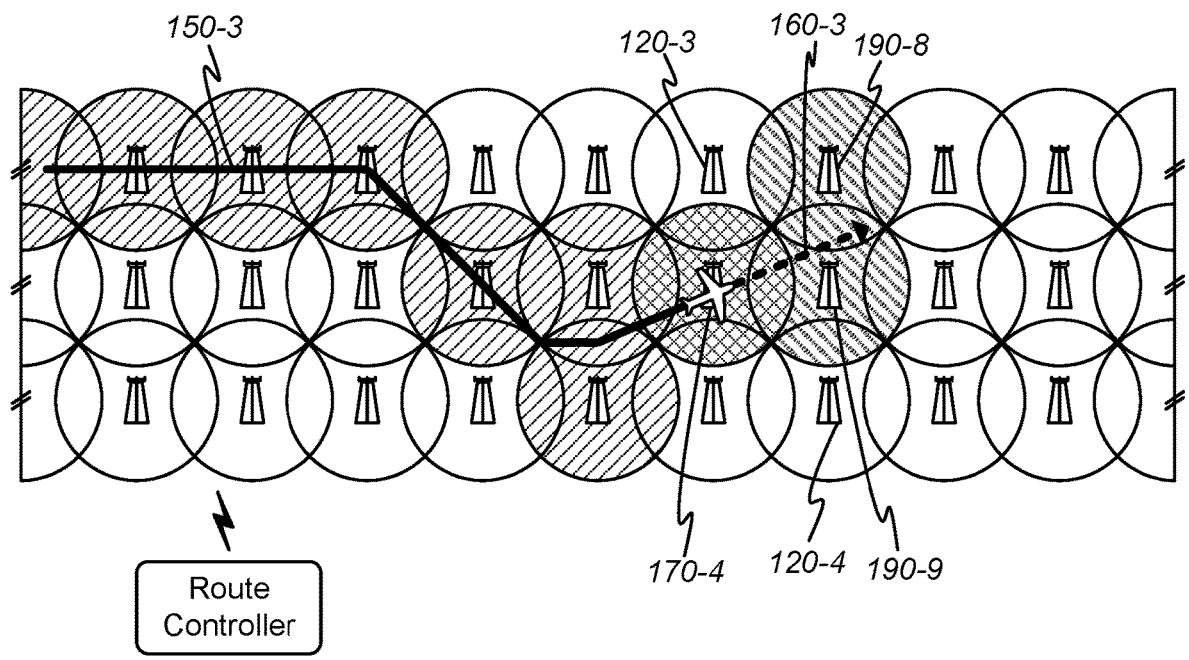

FIG. 1D continues the example of FIG. 1A, FIG. 1B, and FIG. 1C, where aircraft 140 is now associated with serving ground station 170-4. Previously active ground station 170-3 may have been deactivated and added to the list of previously-serving ground stations. As shown, actual path 150-3 has deviated from previously predicted path 160-2. Based on the selection of serving ground station 170-4, predicted path 160-3 may be generated or updated. Candidate ground stations 190-8 and 190-9 are identified based on predicted path 160-3, while ground stations 120-3 and 120-4 are not identified as candidates (e.g., each may have an associated probability of selection that is less than a threshold value) and thus may not be activated.

Figure 2:
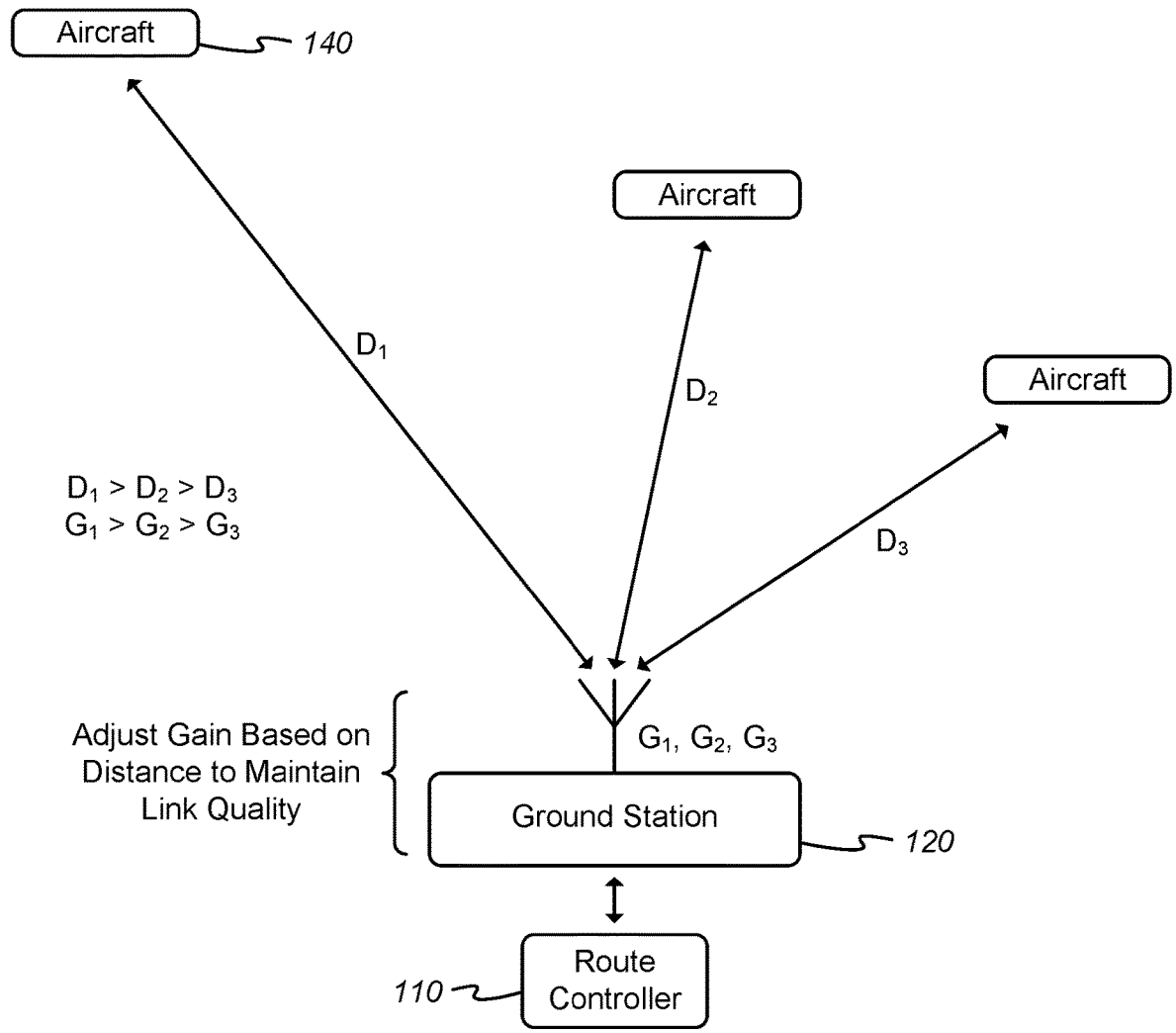
FIG. 2 illustrates use of gain adjustment to maintain link quality over varying distance.

As shown in FIG. 2, during active communication, route controller 110 may adjust the gain of ground station 120 based on the line-of-sight distance between the active or serving ground station 120 and aircraft 140 (sometimes referred to herein simply as "distance," for the sake of brevity) to maintain link quality. Aircraft location may be determined based on a position provided by aircraft 140 or estimated by one or more ground stations 120. Distance between aircraft 140 and ground station 120 may be calculated by comparing aircraft location to one or more known ground station locations. Each route controller 110 may utilize a listing of ground stations 120 and their associated positions (e.g., as specified by longitudinal and latitudinal coordinates, as specified by global positioning system (GPS) coordinates, etc.), where the listing may also be available to some or all ground stations 120 associated with route controller 110 (i.e., each ground station 120 included in the listing may be able to access a listing of locations of all ground stations in the listing).

Link quality may be determined by route controller 110, active ground station 120, and/or aircraft 140, based on various appropriate measured and/or calculated attributes or parameters (e.g., path loss, signal to noise ratio, delay, etc.). In addition to determining current distance between ground station 120 and aircraft 140 and link quality, some embodiments may predict distance and link quality at a future time and adjust transmission gain to maintain a desired link quality, as specified by the appropriate measured or calculated attributes.

Transmission gain or other similar parameters or attributes (e.g., analog or digital filter attributes, signal processing parameters, frequency or delay adjustments, etc.) may be adjusted such that the signal received at each aircraft 140 exceeds a quality target threshold. Similar reception gain or other adjustments may be made such that the signal received at each ground station 120 (e.g., from aircraft 140) exceeds a quality target threshold. In some embodiments, aircraft 140 may also measure link quality and perform various actions to maintain link quality (e.g., by adjusting transmission gain, reception gain, delay, etc.). Examples of determination and prediction of distance and link quality, and transmission gain adjustment will be described in more detail in reference to FIG. 7 and FIG. 8 below.

Figure 3A:
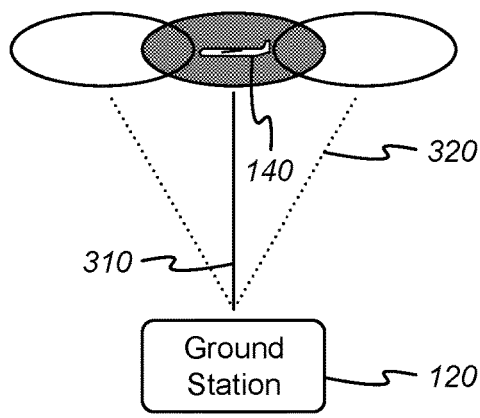
FIGS. 3A and 3B illustrate an example mapped antenna beam array associated with a ground station of some embodiments.
Figure 3B:
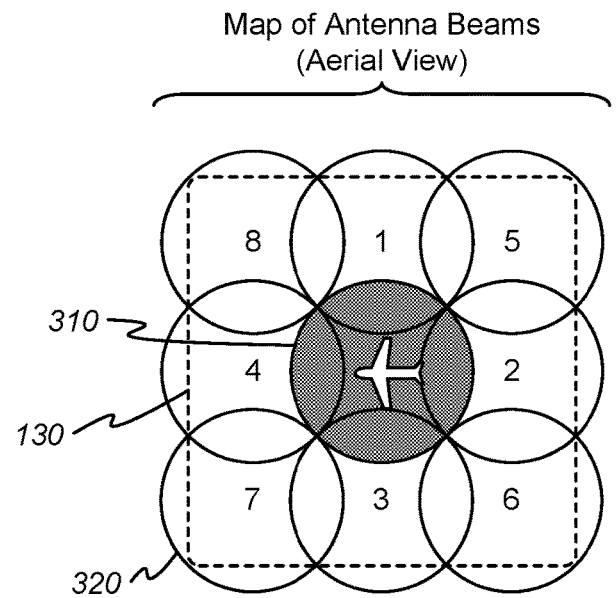

As shown in FIG. 3A, each ground station 120 may be associated with multiple antennas (and/or multiple antenna beams, which may be the result of the multiple antennas). In this example, there is one active or "serving" beam 310 (denoted in this figure by a solid line) and multiple inactive beams 320 (denoted in the figure by dotted lines). As shown in the aerial view of FIG. 3B (e.g., an aerial view of ground station 120 and antenna beams 310-320, depicted in FIG. 3A), antenna beams 310-320 together may provide overall coverage area 130 of ground station 120. In this example, beams 320 are represented by a respective number (e.g., 1-8, in this example). In addition, serving beam 310 may be assigned an identifier.

Figure 4A:
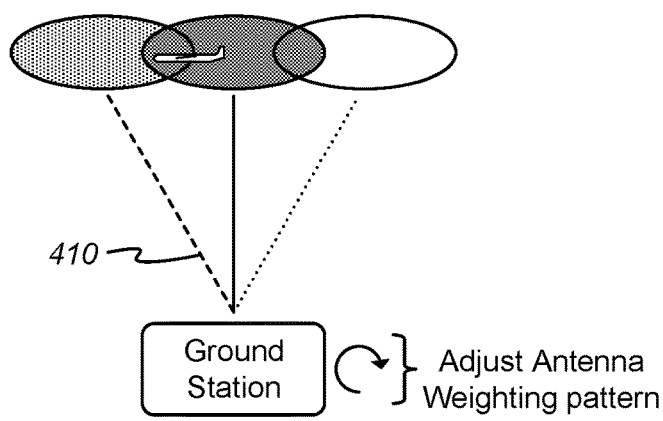
FIGS. 4A and 4B illustrate probabilistic antenna beam mapping and antenna beam weighting based on a predicted path of an aircraft.
Figure 4B:
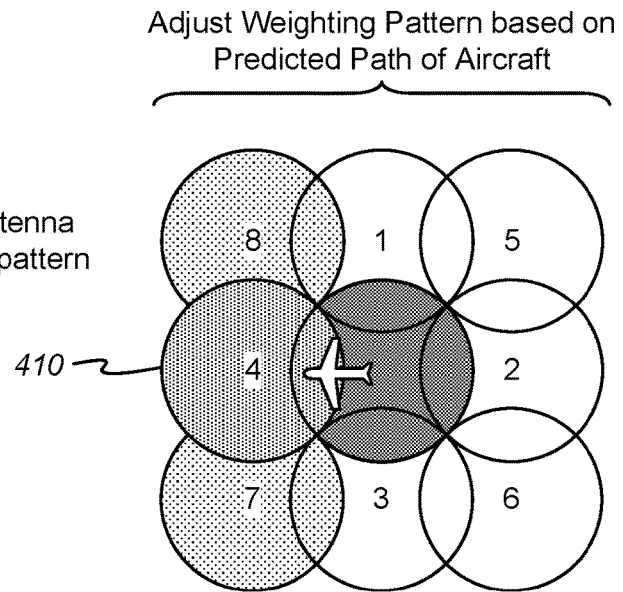

Continuing with this example, and referring to FIG. 4A, as aircraft 140 moves from right to left (e.g., moves from its position depicted in FIG. 3A to the position depicted in FIG. 4A), one or more candidate serving beams 410 (depicted in this figure as a dashed line) may be identified, in order to maintain connectivity for aircraft 140. As shown in FIG. 4B, based on an expected straight-line path, route controller 110 may identify adjacent beam 4 as the most likely candidate (e.g., that aircraft 140 is most likely to enter a coverage area of beam 4, as compared to the coverage areas of the other beams), while adjacent beams 7 and 8 may be identified as less likely candidates, where each candidate may be associated with a calculated probability of selection. In order to limit power consumption, some embodiments may adjust transmission power of each candidate beam 410 based on the calculated probability of selection. Thus, in this example, adjacent beam 4 may transmit at full power based on high likelihood of being selected as the serving beam, while adjacent beams 7 and 8 may transmit at a lower power, depending on their likelihoods of selection, and while beams 1, 2, 3, 5, and 6 may not be powered on.

Figure 5:
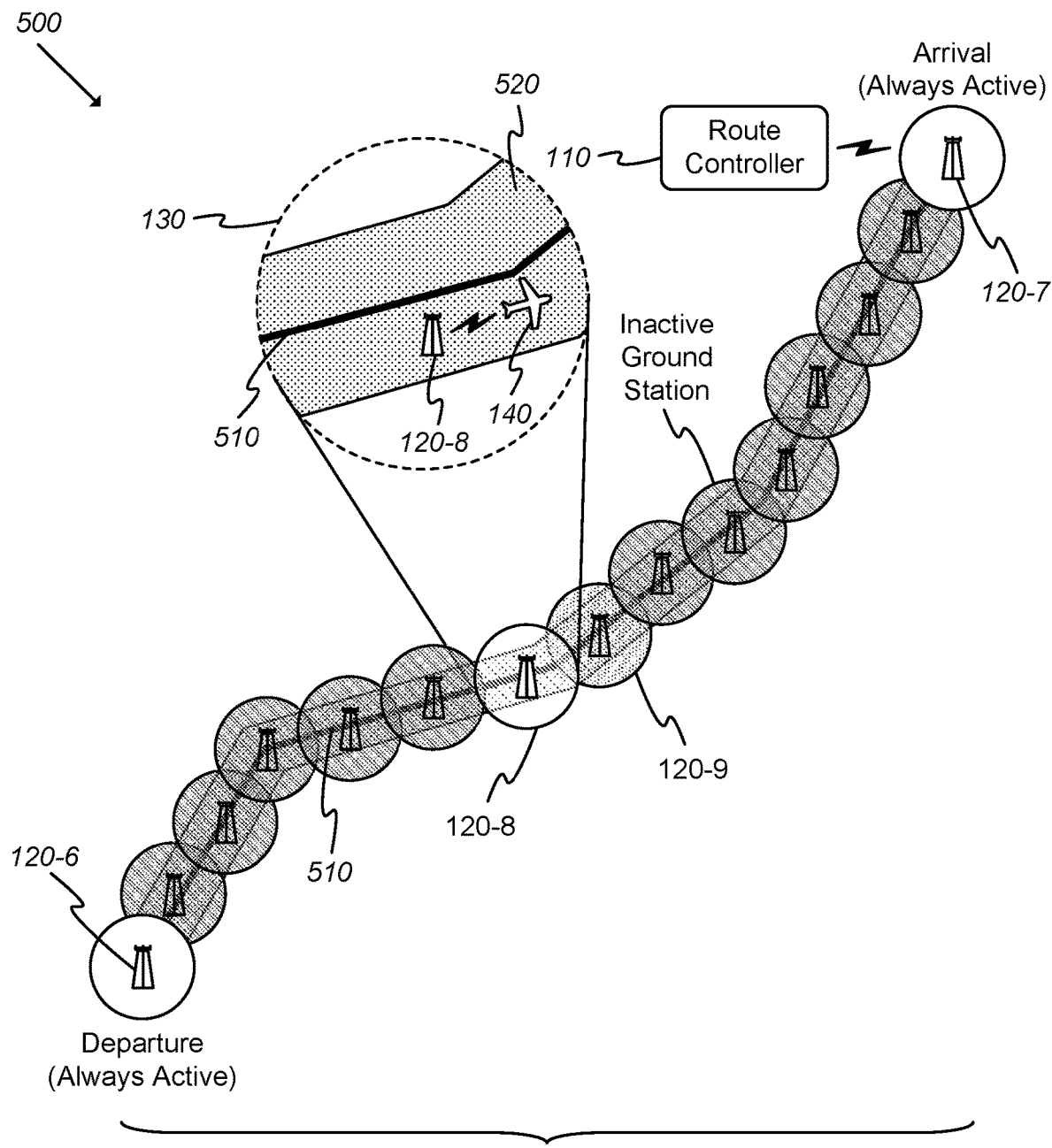
FIG. 5 illustrates an example embodiment described herein, in which ground stations are located along a flight path to provide network connectivity along the flight path.

FIG. 5 illustrates an example system 500, in which ground stations 120 are located along a flight path 510 to provide network connectivity along the flight path. Flight path 510 may be pre-defined, as in this example, between a departure location and an arrival location (e.g., airports, airfields, airstrips, heliports, helipads, drone landing pads, launch sites, etc.). In this example, each ground station 120 has a coverage area 130 that spans a portion of flight path range 520. Depending on the relative sizes of the flight path range and coverage area 130, different embodiments may include different arrays of ground stations such that full travel range 520 is within coverage areas 130 of the array of ground stations 120. While each coverage area 130 is shown as circular in this example, different embodiments may have differently shaped and/or arranged coverage areas. For instance, each coverage area may be generally round, oval, square, rectangular, polygonal, and/or other appropriate arrangements based on various relevant factors (e.g., antenna type or arrangement, power requirements, size or shape of full travel range, expected aircraft altitude, etc.).

Some embodiments may include aircraft 140 with undefined, unknown, or irregular flight paths 510. For instance, a weather balloon may float along a path that partially overlaps one or more coverage areas 130 such that balloon may be able to communicate with one or more ground stations 120 at irregular or unpredictable intervals, where the actual path taken by the balloon may vary depending on wind conditions or other such factors.

In addition, some embodiments may be associated with limited-use paths or applications with more limited communication needs. For example, a fire patrol drone may be deployed such that its regular flight path coincides with at least one coverage area 130, allowing data to be uploaded or downloaded at regular intervals, where the drone may not require an active communication link along the entire path (or other sections of the flight path may be associated with other ground station systems 100 or other communication resources). As another example, a non-commercial or limited-use flight path may not justify deployment of path-specific ground stations 120, but limited-use path may still intersect portions of coverage areas 130 such that connectivity may be provided over at least a portion of the limited-use path.

Each aircraft 140 may be an airplane, jet, drone, unmanned aerial vehicle, balloon, blimp, dirigible, rocket, spacecraft, or any other device able to travel through the atmosphere. Such aircraft may typically be deployed within the troposphere, but embodiments described herein may be implemented for various different altitude ranges, as appropriate for the specific aircraft intended to be served over coverage area 130.

As aircraft 140 travels from the departure location to the arrival location, one ground station 120 may be an active or "serving" ground station that has an open communication channel with aircraft 140. The active ground station 120 may provide network connectivity to aircraft 140, where such connectivity may be distributed across various platforms (e.g., entertainment systems, communication systems, wireless networks or channels, etc.) and/or users (e.g., crew, passengers, automated systems, etc.) at the aircraft.

In this example, there are two always-active ground stations 120-6 and 120-7 (at the departure location and the arrival location). Such ground stations may be located at or near airports, terminals, pads, and/or other such high-activity locations. In addition, there is one active ground station 120-8, indicated by a light fill. As shown in the blown-up area, aircraft 140 is located within coverage area 130 of active ground station 120-8, travelling near flight path 510 and within range 520.

A handoff candidate ground station 120-9 (as indicated by a medium fill) may be in an active or semi-active state (e.g., as during a wakeup or powerup operation) in anticipation of a handoff as aircraft 140 travels along flight path 510. All other ground stations 120 may be inactive in order to save power, as no connection is anticipated.

Ground stations 120 in an inactive state may power down (or operate at reduced power) various components or sub-systems in order to save power and/or minimize interference. For instance, radio transmitters may be completely powered off in an inactive state or may be operated at reduced power. Inactive ground stations 120 may still be able to communicate among other ground stations such that inactive stations may receive information and/or communications including activation messages as an aircraft 140 approaches (or is anticipated to approach). In some embodiments, radio receivers of inactive ground stations 120 may be deactivated. In other embodiments, receivers may remain active or may be operated in a reduced power state such that "pings" or beacon signals may be received from aircraft 140 following irregular or unknown flight paths, flight paths that intersect only a portion of the system coverage area, and/or other such paths where an aircraft may not be expected based on a previous or current serving link.

Figure 6:
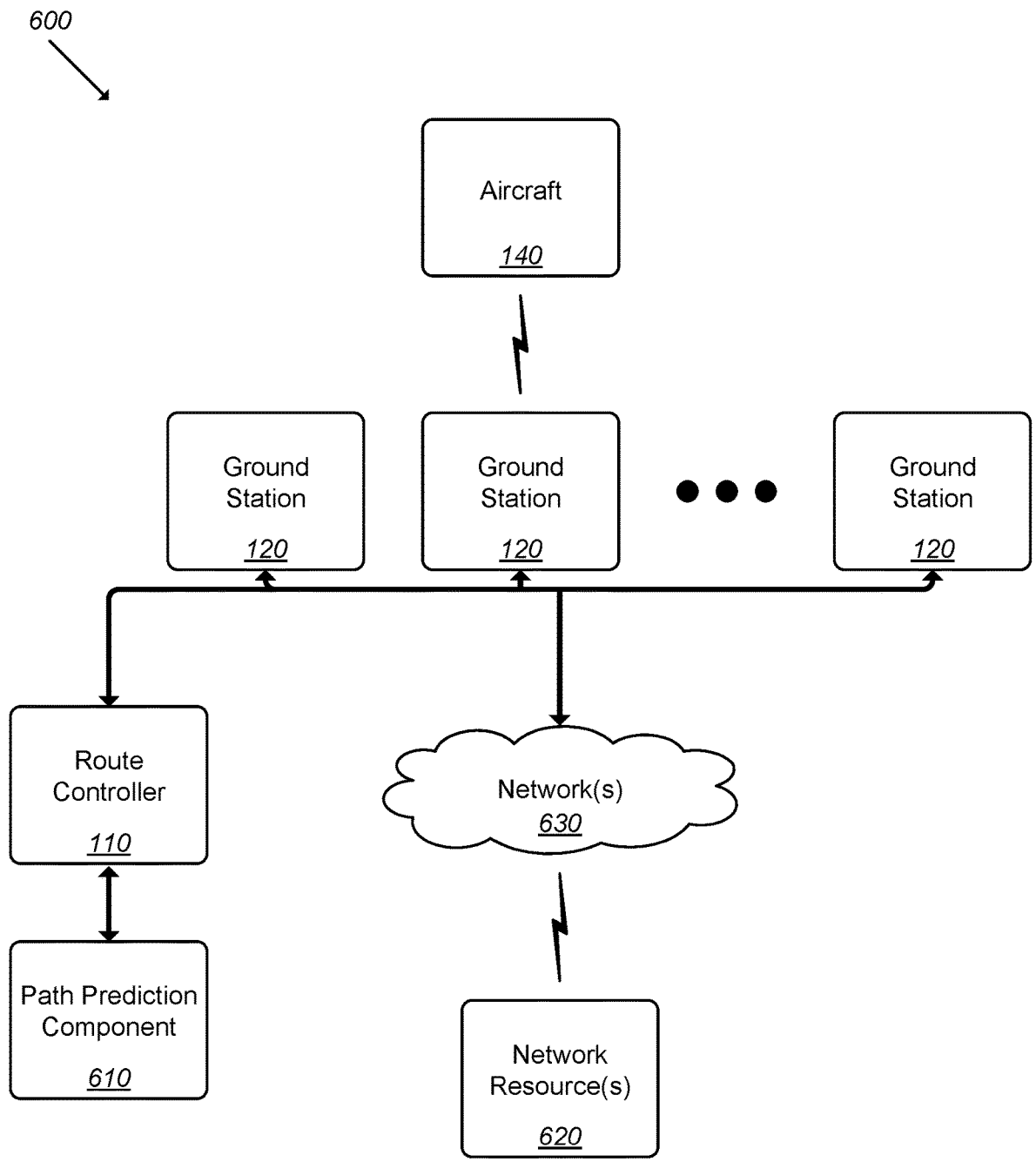
FIG. 6 illustrates an example environment in which one or more embodiments, described herein, may be implemented.

FIG. 6 illustrates an example environment 600 in which one or more embodiments, described herein, may be implemented. As shown, environment 600 may include one or more aircraft 140, a set of ground stations 120, route controller 110, path prediction component ("PPC") 610, various network resources 620, and network 630. The quantity of devices and/or networks, illustrated in FIG. 6, is provided for explanatory purposes only. In practice, environment 600 may include additional devices and/or networks; fewer devices and/or networks; different devices and/or networks; or differently arranged devices and/or networks than illustrated in FIG. 6. For example, while not shown, environment 600 may include devices that facilitate or enable communication between various components shown in environment 600, such as routers, modems, gateways, switches, hubs, etc. Alternatively, or additionally, one or more of the devices of environment 600 may perform one or more functions described as being performed by another one or more of the devices of environments 600. Devices of environment 600 may interconnect with each other and/or other devices via wired connections, wireless connections, or a combination of wired and wireless connections. In some implementations, one or more devices of environment 600 may be physically integrated in, and/or may be physically attached to, one or more other devices of environment 600.

Aircraft 140 may include various components that are capable of communicating with one or more ground stations (e.g., ground station 120). For example, aircraft 140 may include a radio or other communication components that allow the aircraft to communicate across a wireless communication channel. Similar to those described above in reference to ground stations of some embodiments, each aircraft may include one or more antenna arrays that may be able to interact with one or more complementary arrays at one or more ground stations 120 (and/or arrays associated with multiple ground stations 120).

In some implementations, aircraft 140 may be, or may include, an airplane, balloon, dirigible, a drone or other unmanned airship, helicopter, spaceship, rocket, etc. In some embodiments, aircraft 140 may be a multi-passenger commercial airplane. Aircraft 140 may include elements such as a propulsion system, fuel storage, navigation system, and/or other appropriate components that may allow aircraft 140 to move along an elevated flight path.

Aircraft 140 may include various sub-systems (e.g., entertainment units) that may provide content (e.g., media content, web pages, etc.) to users and/or execute applications (e.g., web browsers, email, games, etc.). Such sub-systems may further include user interface elements (e.g., keypads, touchscreens, etc.) that are able to receive inputs from users and apply such inputs to content provision or application execution. An entertainment unit may be, or may include, a display, audio output elements, audio inputs, cameras, touchscreens, keypads, remote controls, wireless connectivity (e.g., Bluetooth), etc. Users may include passengers, crew or staff, remote operators or pilots, and/or other appropriate entities.

In some embodiments, aircraft 140 may provide one or more wireless local area networks, channels, or links (e.g., Wi-Fi, Bluetooth, etc.) that may be accessed by various user equipment ("UE"). Such UEs may include any computation and communication device that is capable of communicating with one or more networks. For example, the UEs may include a device that receives content, such as web pages (e.g., that include text content and/or image content), streaming audio and/or video content, and/or other content, via an Internet connection and/or via some other delivery technique. The UEs may also receive user interactions (e.g., voice input, touches on a touchscreen, "clicks" via an input device such as a mouse, etc.).

In some implementations, a UE may be, or may include, a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a camera, a television, a personal gaming system, a wearable device, and/or another type of computation and communication device.

Each ground station 120 may include one or more devices (e.g., a radio transmitter and receiver) that perform one or more actions described herein. The radio transmitter and receiver may be able to provide wireless connectivity (e.g., 5G connectivity, Long-Term Evolution ("LTE") connectivity, etc.) to one or more aircraft 140. Each ground station 120 may further be able to connect to a terrestrial or wired communication link (e.g., via an X2 link, optical network, etc.) such that each ground station may be able to connect to the Internet, and to each other ground station, route controller 110, and/or other system resources. Ground station 120 may be similar to ground station 120 described above.

Route controller 110 may include one or more devices (e.g., a server device or a distributed set of devices, such as a cloud computing system) that perform one or more actions described herein. In some embodiments, portions of the functionality described below with respect to route controller 110 may be implemented at ground station 120 or other system devices that are able to communicate with the ground stations. Route controller 110 may at least partly direct the operations of ground stations 120. Such operations may include, for instance, activation, deactivation, handover, antenna beam weighting, gain adjustments, etc. In some embodiments, some or all of the functionality of route controller 110 may be performed by one or more ground stations 120 (e.g., functionality of the controller may be implemented in a distributed manner by one or more ground stations).

In some embodiments, one or more ground stations 120 (and/or other system components) may act as route controller(s) 110 that may manage communications among ground stations and may at least partly direct the operations of the ground stations. In some embodiments, all ground stations may communicate among each other and may collectively or individually manage operations based on such communication. For instance, any ground station with an active communication channel to an aircraft 140 may communicate information related to the aircraft (e.g., position, heading, signal strength, etc.) and each other ground station 120 may evaluate the received information to determine whether to perform any relevant operations (e.g., activation based on an approaching aircraft, deactivation based on a departing aircraft, adjustments of signal strength, etc.).

PPC 610 may include one or more devices (e.g., a server device or a distributed set of devices, such as a cloud computing system) that perform one or more actions described herein. In some embodiments, portions of the functionality described below with respect to PPC 610 may be implemented at route controller 110 or other system devices that are able to interact with ground stations 120. PPC 610 may manage prediction requests from route controller 110 and may implement machine learning and/or other suitable techniques to improve prediction performance. PPC 610 may be associated with a repository that includes flight path information (planned and actual), serving station and/or serving beam information, aircraft information, etc.

Network resources 620 may include any network-accessible content, applications, data, etc. For instance, such network resources may include web pages, streaming content servers or repositories, communication channels (e.g., voice over internet protocol ("VoIP")), and/or other resources that may be accessed over network 630.

Network 630 may include one or more radio access networks ("RANs"), via which ground stations 120 or other system components may access one or more other networks or devices, a core network of a wireless telecommunications network, an IP-based packet data network ("PDN"), a wide area network ("WAN") such as the Internet, a private enterprise network, and/or one or more other networks. In some implementations, network 630 may be, include, or be in communication with a cellular network, such as an LTE network, a Third Generation ("3G") network, a Fourth Generation ("4G") network, a 5G network, a Code Division Multiple Access ("CDMA") network, etc. Ground station 120 may connect to, and/or otherwise communicate with, via network 630, data servers, application servers, other ground stations 120, etc. Network 630 may be connected to, and/or otherwise in communication with, one or more other networks, such as a public switched telephone network ("PSTN"), a public land mobile network ("PLMN"), and/or another network.

Figure 7:
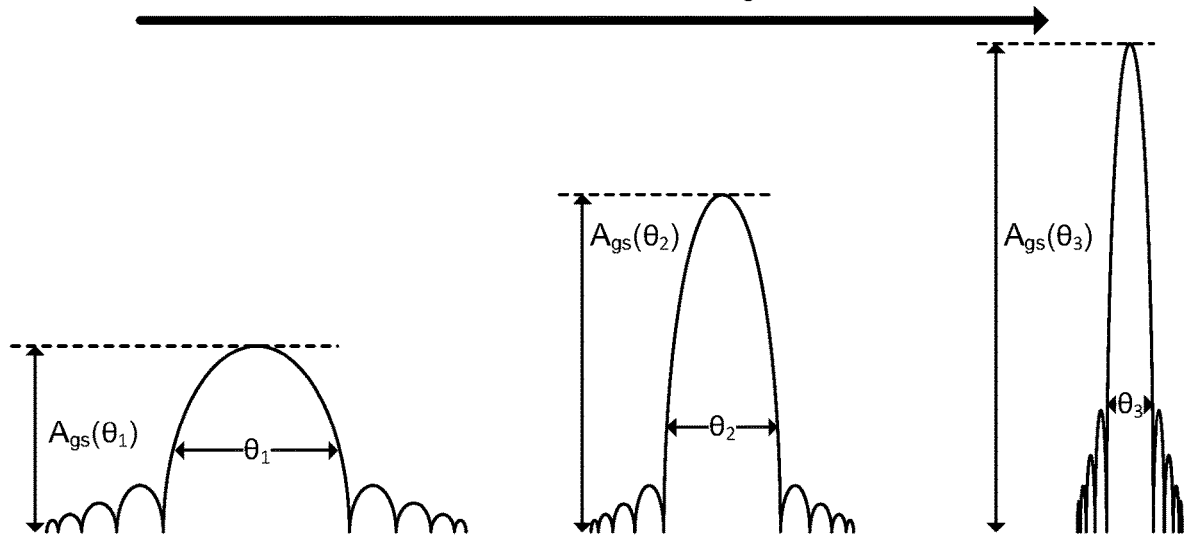
FIG. 7 illustrates variation of antenna beam width as used to adjust gain in accordance with performing techniques described herein.

FIG. 7 illustrates variation of antenna beam width as used in accordance with some embodiments (e.g., by route controller 110) to adjust gain in accordance with performing techniques described herein. As shown, antenna beam width $\theta$ is inversely proportional to antenna gain $A_{gs}$. In this example, $\theta_1 > \theta_2 > \theta_3$ and the main lobe 3 dB gains are $A_{gs}(\theta_1) < A_{gs}(\theta_2) < A_{gs}(\theta_3)$. Also, in this example, $\theta_1 = \theta_2 + \Delta\theta$ and $\theta_3 = \theta_2 - \Delta\theta$. Further, in this example, $A_{gs}(\theta_1) = A_{gs}(\theta_2) - \Delta A_{gs}$ and $A_{gs}(\theta_3) = A_{gs}(\theta_2) + \Delta A_{gs}$. Different embodiments may utilize various different antenna beam patterns that may be dynamically constructed at a radio sub-system by changing weights of antenna elements (e.g., by varying gain and/or transmission power of each antenna element).

Figure 8:
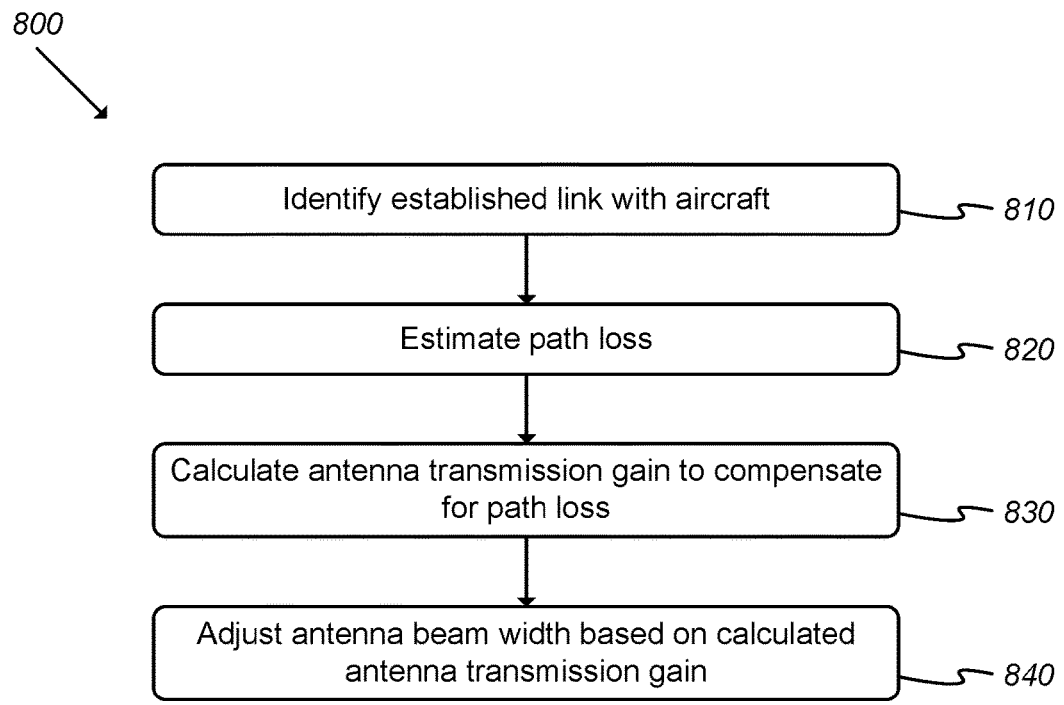
FIG. 8 illustrates an example process by which antenna beam width may be adjusted to maintain a desired signal quality between a ground station and an aircraft.

FIG. 8 illustrates an example process 800 by which antenna beam width may be adjusted to maintain a desired signal quality between a ground station and an aircraft. As described herein, the communication channel or link between ground station and aircraft may be utilized to provide network connectivity to the aircraft and subsystems thereof. Process 800 may be performance as an initial setup process, when a handoff to a different serving antenna beam or ground station is performed, at regular intervals during aircraft travel, and/or at other appropriate times. In some embodiments, process 800 may be performed by route controller 110. In some embodiments, process 800 may be performed by one or more other devices in addition to, or in lieu of, route controller 110 (e.g., by aircraft 140, ground station 120, etc.).

As shown, process 800 may include identifying (at 810) an established link between a ground station 120 and an aircraft 140. Such a link may be established in various appropriate ways, using various appropriate protocols (e.g., a handshake protocol). In some embodiments the link may be established after an aircraft 140 passes a minimum altitude or otherwise enters the coverage area of a ground station 120. Such a link may be associated with a particular serving ground station 120 and/or particular serving beam thereof. The link may include a forward or transmission element, or a "forward link" (e.g., from ground station to aircraft) and a reverse or receiving element, or a "reverse link" (e.g., from aircraft to ground station).

Process 800 may include estimating (at 820) path loss over the link. In this example, path loss may be used as the measure of link quality, but different embodiments may utilize different measures of link quality (e.g., SNR, delay or offset, etc.). Route controller 110 may, in some embodiments, estimate path loss using Formula 1 and Formula 2 below.

$$L(t+\Delta t)=L(D(t+\Delta t))=L(D(t))+\Delta L(\Delta D(t+\Delta t)) \quad \text{(Formula 1)}$$

$$\Delta D(t+\Delta t))=D(t+\Delta t)-D(t) \quad \text{(Formula 2)}$$

In Formulas 1 and 2, L represents path loss, D represents link distance and changes over time $\Delta L(\Delta D)$ due to changes in link distance $\Delta D$ may be estimated based on timing advance or evaluation of reverse link transmit and receive power, which will be discussed in more detail below. Distance D may reflect a distance in three dimensions (e.g., may be based on altitude or elevation difference between ground station 120 and aircraft 140 and antenna beam width $\theta$ or "spread" of the antenna beam at that altitude). In some embodiments, a current distance D(t) may be able to be precisely calculated rather than estimated (e.g., by analyzing GPS coordinates provided by aircraft 140 to GPS coordinates of ground station 120).

In some embodiments, changes in distance and associated path loss may be estimated based on timing advance. Signal propagation time may be calculated by dividing distance by the speed of light constant as in Formula 3 below.

$$T=D/c \qquad \text{(Formula 3)}$$

Where c is the speed of light constant and T is propagation time (or timing advance), which is used to estimate time of transmission at aircraft 140, based on time of receipt at ground station 120. Propagation time may be estimated initially during a physical random-access channel ("PRACH") connection process that may be performed between ground station 120 and aircraft 140. Subsequently, any changes in timing advance ΔT may be estimated at ground station 120 based on Doppler shift or other appropriate ways. Ground station 120 may periodically notify aircraft 140 of the current propagation time T(t) and any subsequent changes ΔT(t+Δt) over the link, where subsequent changes may be calculated using Formula 4 below.

$$\Delta T(t+\Delta t))=T(t+\Delta t)-T(t) \qquad \text{(Formula 4)}$$

The calculated timing advance or propagation time may be used to determine distance, as shown in Formula 5 below.

$$D(t+\Delta t))=C\cdot T(t+\Delta t) \qquad \text{(Formula 5)}$$

The distance calculated using Formula 5 may then be converted into link loss via a free space path loss ("FSPL") calculation using Formula 6 below.

$$L(t+\Delta t))=\text{FSPL}(D(t+\Delta t)) \qquad \text{(Formula 6)}$$

Alternatively to timing advance, in some embodiments, changes in distance and associated path loss may be estimated based on reverse or return link transmit and receive power. Link path losses of the forward link and the reverse link are the same. While an aircraft 140 is active on the reverse link, ground station 120 may request that aircraft 140 report power headroom ("PH") of the aircraft transmitter. Ground station 120 may be able to retrieve the maximum transmit power of the aircraft transmitter ($TxP_{max-ap}$), where the maximum transmit power may be retrieved from aircraft 120, from a database, lookup table, or repository, and/or other appropriate resources. The actual transmit power of aircraft 140, $TxP_{ap}(t)$, may be calculated using Formula 7 below.

$$TxP_{ap}(t)=TxP_{max-ap}-PH(t) \qquad \text{(Formula 7)}$$

The ground station receiver may measure the received signal power from aircraft 140, $RxP_{gs}$. The link path loss, L, may be calculated using Formula 8 below.

$$L(t)=RxP_{gs}(t)-TxP_{ap}(t) \qquad \text{(Formula 8)}$$

Based on a previously calculated link path loss, L(t−Δt) and a power up or power down command, TP, current path loss, L(t), may be calculated using Formula 9 below.

$$L(t)=L(t-\Delta t)+\Sigma_0^{\Delta t}TP \qquad \text{(Formula 9)}$$

As shown, process 800 may further calculate (at 830) an antenna transmission gain, $A_{gs}$, to compensate for the estimated path loss, L(t). Some embodiments may calculate receive power at ground station 120, $RxP_{gs}$, using Formula 10 below.

$$RxP_{gs}(t)=TxP_{ap}(t)+A_{gs}(\theta(t))-L(D(t))+A_{ap}(\varphi(t)) \qquad \text{(Formula 10)}$$

Where aircraft antenna gain $A_{ap}$ and beam width φ are assumed to be fixed. Link quality may be managed in some embodiments by keeping receive power $RxP_{gs}$ constant. One approach may include adjusting antenna gain $A_{gs}$ to compensate for changing link distance D. Another approach may include adjusting transmit power, by adjusting operating bandwidth, if aircraft 140 is capable of such adjustments and/or implements such adjustments based on communications received from ground station 120. Still another approach, as described herein, may include adjusting both the transmit power and the antenna gain.

Process 800 may further include adjusting (at 840) antenna beam width θ such that the calculated antenna transmission gain $A_{gs}$ is provided and constant receive power and thus link quality is maintained. Process 800 may be executed iteratively, or at regular intervals, depending on anticipated or actual movement of aircraft 140, based on analysis of received communications to identify signal quality has degraded below an acceptable threshold, and/or other based on other appropriate execution criteria.

Figure 9A:
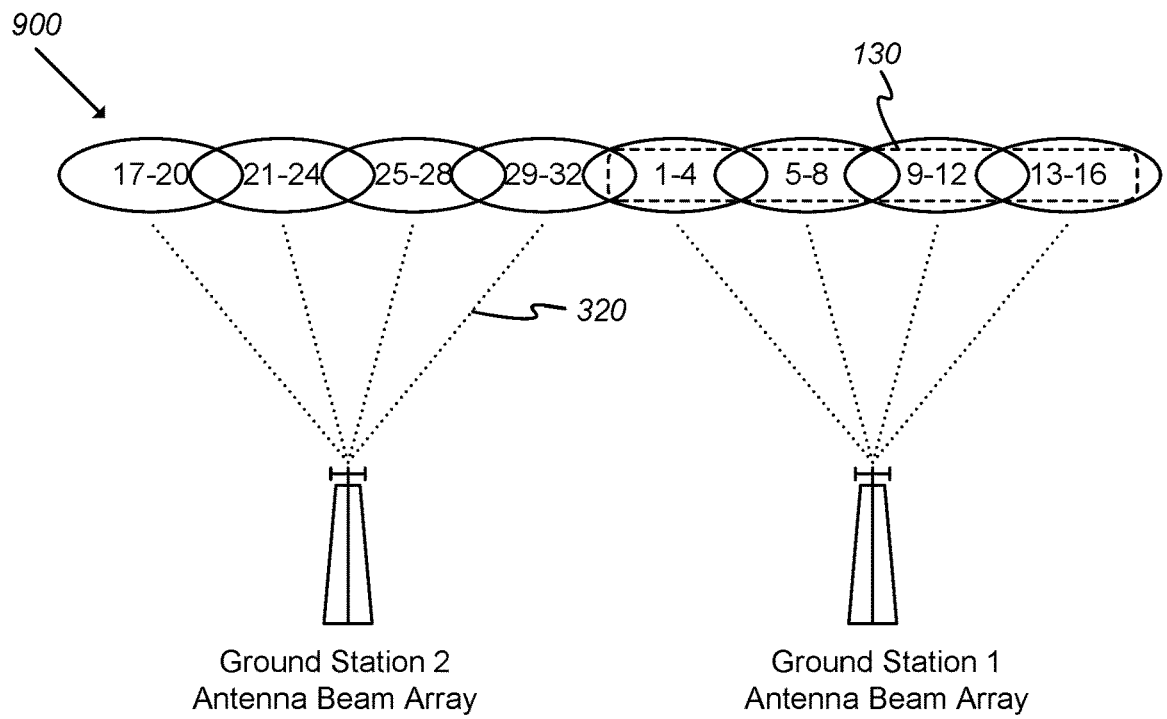
FIGS. 9A and 9B illustrate an example mapped antenna beam array that spans multiple ground stations of some embodiments.
Figure 9B:
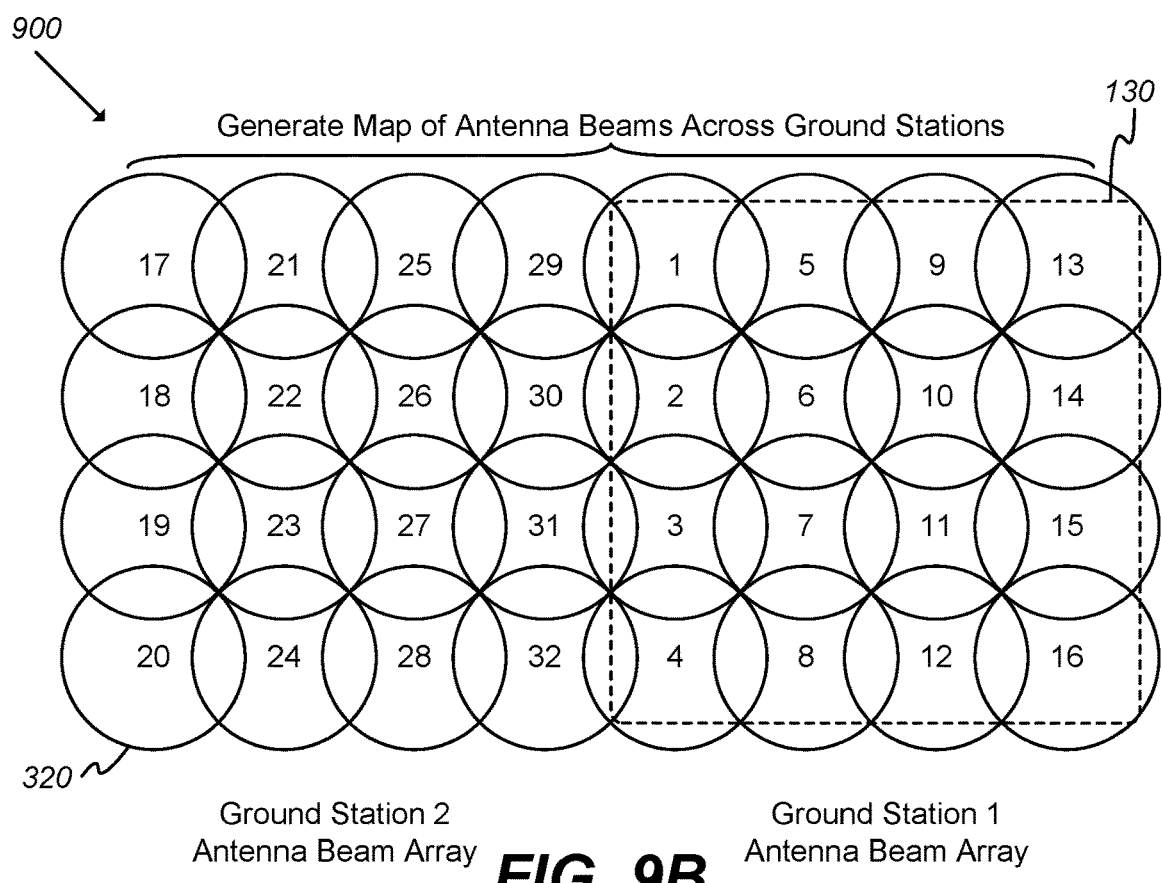

FIGS. 9A and 9B illustrate an example mapped antenna beam array 900 that spans multiple ground stations 120 of some embodiments. Such a mapping may include a unique identifier for every antenna beam across every ground station included in array 900.

As described above in reference to system 100, some embodiments may include a listing of ground stations 120 included in system 100. Some embodiments may retrieve the listing of ground stations 120, retrieve or generate a listing of antenna beams associated with each ground station, and generate a system-wide map that uniquely identifies each antenna beam and provides a relative or absolute location of each identified beam.

In the example of FIGS. 9A and 9B, each ground station 120 is associated with sixteen antenna beams 320. Different embodiments may include different numbers of beams, different arrangements of beams, differently shaped or sized beams, and/or otherwise include different specific antenna and/or beam arrays depending on considerations such as flight path length and width, array size, power consumption, etc. In addition, this example includes two ground stations 120 that are associated with aligned and adjacent coverage areas 130, but different embodiments may include different numbers of ground stations 120 arranged in various different configurations. For instance, ground stations may be arranged such that coverage areas 130 are offset in order to better align with a flight path or service area. As another example, ground stations 120 may not always be associated with continuous service areas, as gaps may exist due to natural or man-made barriers and/or other reasons. Furthermore, any number of ground stations 120 may be included in an array 900, depending on the size of coverage area, attributes of a flight path, and/or other relevant factors. For instance, ground stations 120 may be arranged to provide an overall coverage area that is twice the width of each coverage area 130 along the entire length of the flight path.

Each beam 320 may be associated with ground station 120 and may be mapped in relation to other beams 320 associated with ground station 120. In this example, beams 320 are uniquely numbered for identification. Different embodiments may identify the beams in various different ways using various appropriate identifiers. In addition, the beams of each ground station 120 may be mapped in relation to the beams of every other ground station 120 such that a mapped array 900 of all system beams 320 is provided.

Some embodiments may re-map or transpose beam identifiers as an aircraft is served by the system of some embodiments. For instance, if an aircraft is served by a particular beam, adjacent beams may be retrieved and mapped according to adjacent location as in the example of FIG. 3B.

Figure 10:
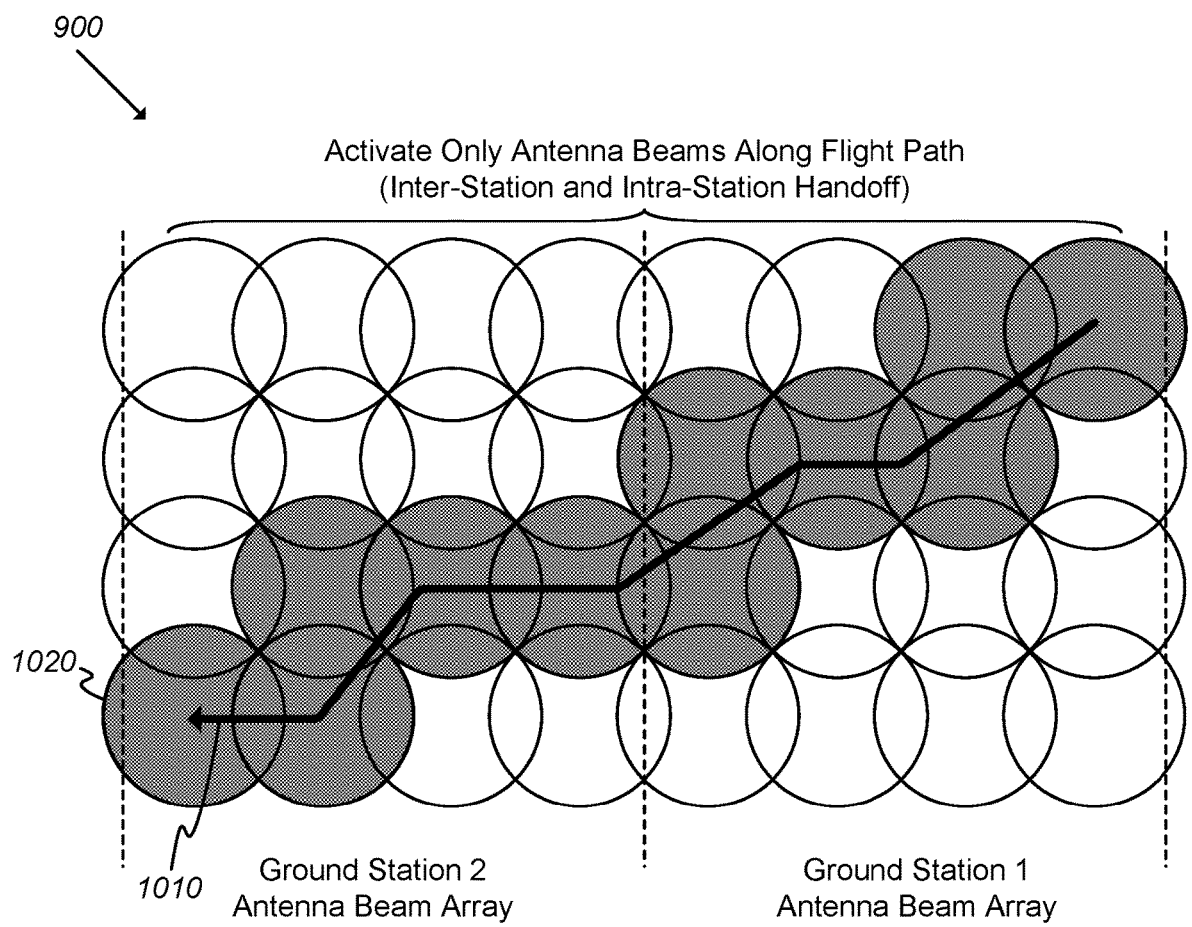
FIG. 10 illustrates an example flight path and associated activated antenna beams across multiple ground stations of some embodiments.

FIG. 10 illustrates an example flight path 1010 and associated serving antenna beams 1020 (as indicated by a dark fill pattern) across multiple ground stations of some embodiments. As shown, only antenna beams along flight path 1010 are activated as serving antenna beams. As described herein, other beams may be partially activated (e.g., operated at reduced power) based on predicted probability of use. Handoff between antenna beams 320 will be described in more detail in reference to process 1200 below. Handoff between ground stations 120 will be described in more detail in reference to process 1300 below.

Figure 11A:
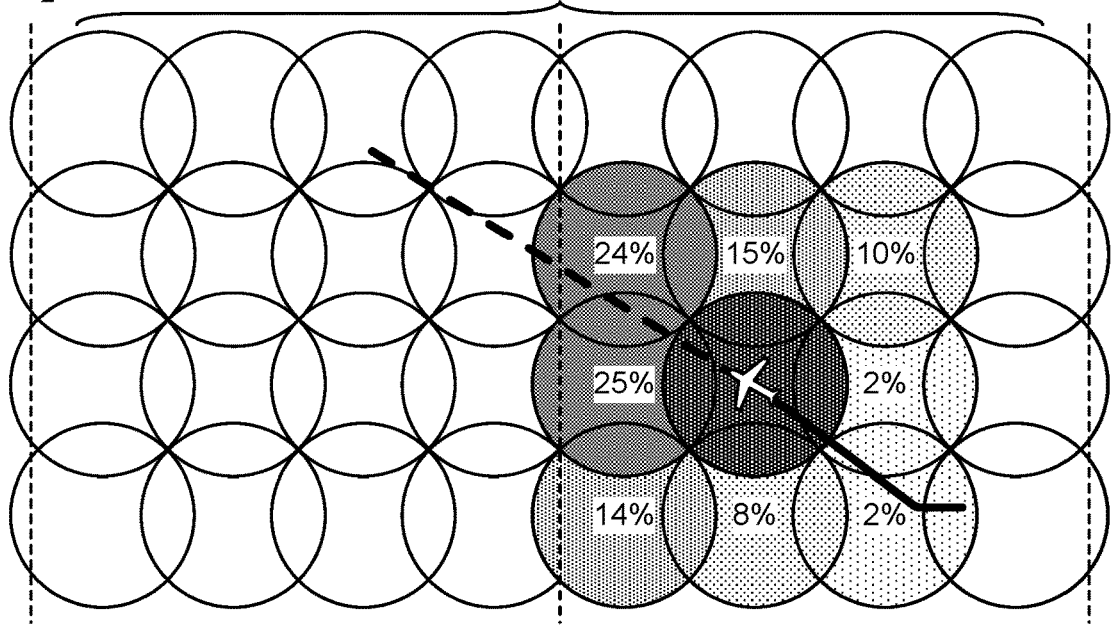
FIGS. 11A and 11B illustrate an example probabilistic beam mapping and associated beam weighting based on the probabilistic mapping.
Figure 11B:
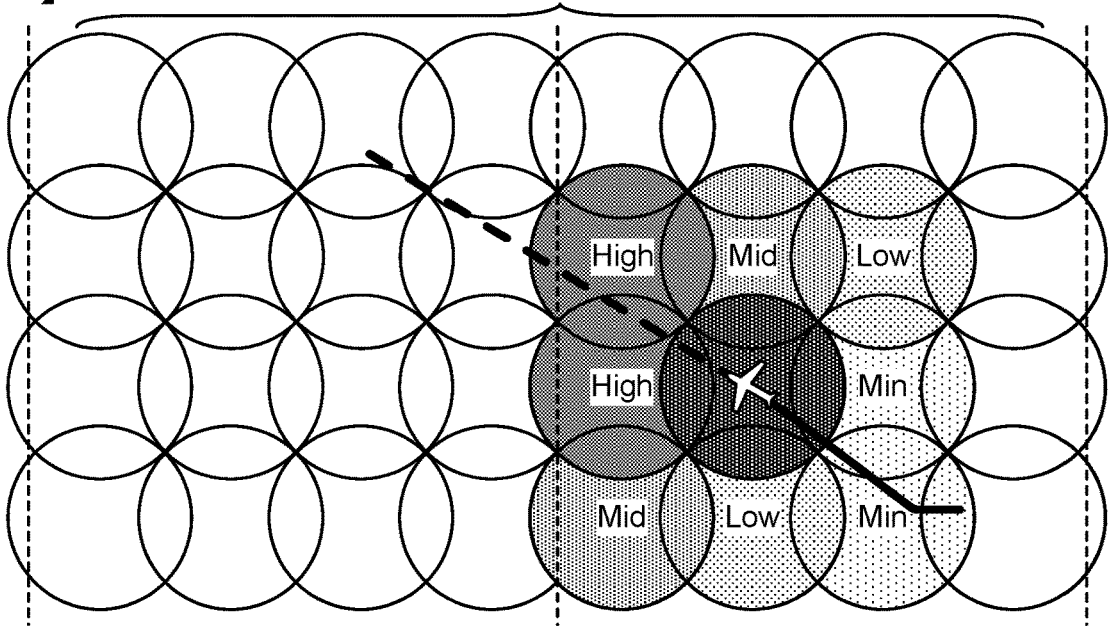

FIGS. 11A and 11B illustrate an example probabilistic beam mapping 1100 and associated beam weighting 1150 based on the probabilistic mapping. As shown in FIG. 11A, a probability of handoff may be calculated for each adjacent beam to the serving antenna beam. Such probability may be based on flight path history (e.g., serving beam and/or serving station history), actual location and heading information, predicted path(s), and/or other relevant factors. For instance, is an aircraft has followed a straight west-to-east path with a history of serving beams along that path, the predicted path may be based on the previous straight-line path (e.g., beams 18, 22, and 26 of FIG. 9B) and may include a high probability that the aircraft will continue along the same eastward path (e.g., beam 30 may be associated with a higher probability of use than other candidate beams and any beams located to the west of beam 26 may be eliminated from consideration as candidates).

In the example of FIGS. 11A and 11B, the probability of each candidate beam eventually acting as the serving beam is represented as a percentage, where the sum of probabilities is one hundred percent. Different embodiments may express such probabilities in various different ways.

As shown in FIG. 11B, antenna transmission power or beam weighting 1150 may be adjusted based on the probabilistic mapping 1100. In this example, transmission power is indicated as various discrete values depending on the associated probability ("Min" power, "Low" power, "Mid" power, and "High" or full power). Different embodiments may adjust transmission power in fine or continuous increments in some embodiments (e.g., transmission power may be adjusted on a sliding scale from zero to one hundred percent to match the associated calculated probability percentage).

In this example, the aircraft is travelling along a generally straight path such that the prediction may have a high level of confidence. Even so, as the path is near a boundary between candidate beams, the two high power beams may be nearly as likely as each other to be the next serving beam. In some embodiments, as when a pre-planned flight path is available, adjacent antenna beams may be associated with zero probability of use (e.g., previous serving beams may not be considered as possible future serving beams, based on continuation along the planned path).

Further, in this example all candidate beams are associated with a single ground station 120. As the serving beam approaches a boundary of one ground station 120, adjacent beams from a neighboring ground station 120 may be identified. In some embodiments, a ground station activation message may include an initial beam weighting based on identification of candidate beams associated with a different ground station.

By limiting scanning to only candidate beams great time savings may be achieved versus scanning every beam associated with each active ground station 120 to identify a next serving beam. In addition, power savings is achieved by deactivating non-candidate beams and/or managing transmission power based on likelihood of use as a serving beam. Furthermore, communication capacity may be increased when fewer beams are activated because of overhead such as sync signal block ("SSB"), which may be required to be broadcast for each active beam.

Figure 12:
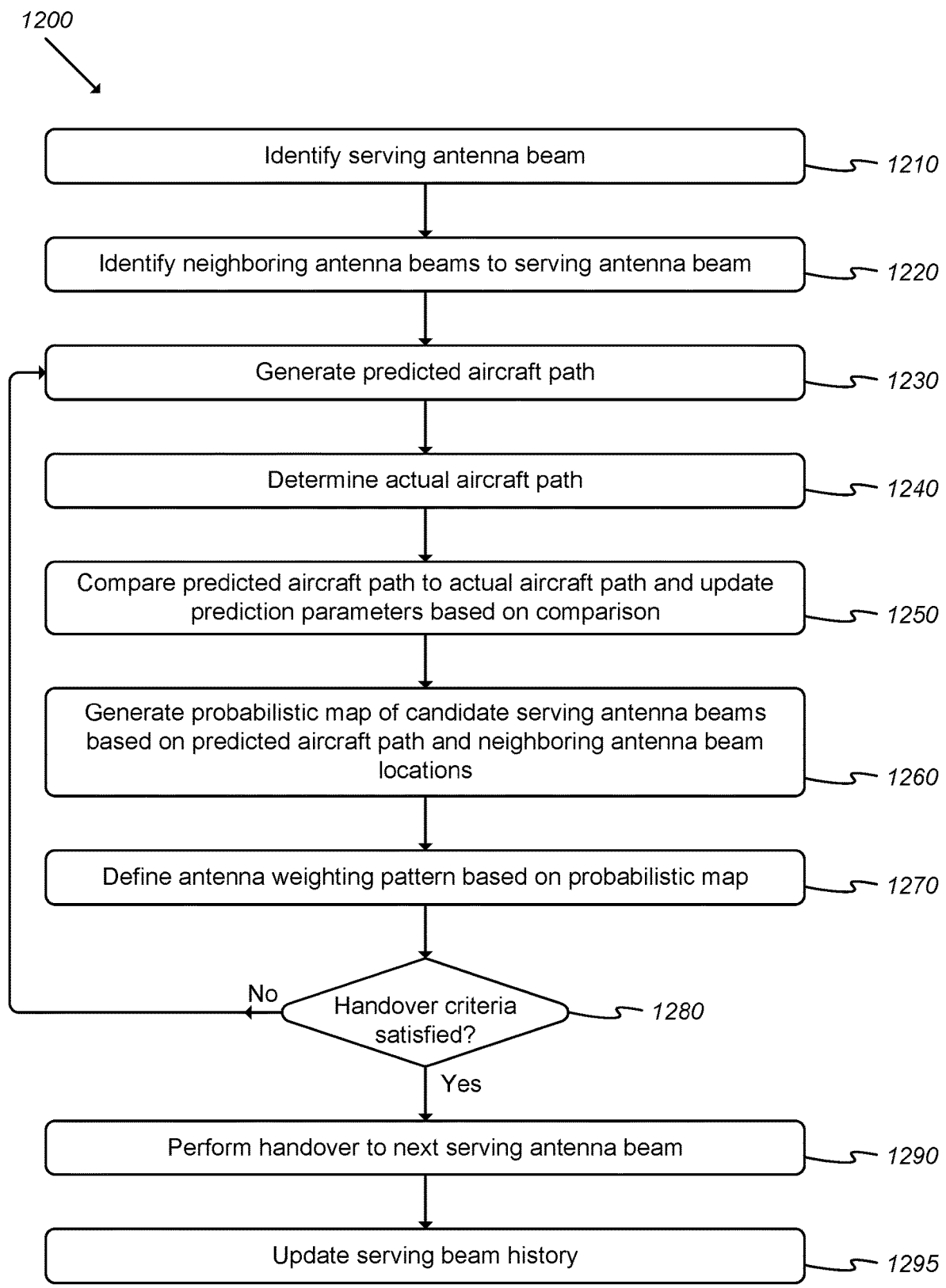
FIG. 12 illustrates an example process by which candidate antenna beams may be identified and handover to a next serving antenna beam may be performed.

FIG. 12 illustrates an example process 1200 by which candidate antenna beams may be identified and handover to a next serving antenna beam may be performed. As described herein, serving beam between a ground station and aircraft may be utilized to provide the communication link of some embodiments. Process 1200 may be performed as an initial setup process, when a handoff to a different serving antenna beam or ground station is performed, at regular intervals during aircraft travel, and/or at other appropriate times. In some embodiments, process 1200 may be performed by route controller 110. In some embodiments, process 1200 may be performed by one or more other devices in addition to, or in lieu of, route controller 110. Furthermore, in some embodiments a complementary process may be performed by other devices, such as aircraft 140, ground station 120, etc.

As shown, process 1200 may include identifying (at 1210) a serving antenna beam. Such a serving antenna beam may be identified in various appropriate ways, such as by identifying a beam with an active communication link between ground station 120 and aircraft 140. In some embodiments, multiple candidate antenna beams may be available to serve as the serving antenna beam. In such cases, a serving antenna beam may be selected from among the candidate antenna beams based on some evaluation criteria (e.g., signal quality, received power level, etc.). If no evaluation criteria are available, an initial serving beam may be selected randomly or by default.

Process 1200 may include identifying (at 1220) neighboring antenna beams to the serving antenna beam. Such neighboring beams may be identified using a beam map such as that described above in reference to FIG. 9B. Process 1200 may include generating (at 1230) a predicted aircraft path. Such path prediction may be performed using a process such as process 1400 described below.

Process 1200 may include determining (at 1240) an actual aircraft path to a present location. Such a determination may be made in various appropriate ways. For instance, position information communicated by aircraft 120 may be stored such that a path is defined by linking the position information over time. As another example, the actual path may be determined based on serving beam and/or serving station history. The path may be defined as a range or a central point of each serving beam or serving station may be stored in a position history. In some embodiments, the actual path may include information such as current heading and/or current speed.

The process may include comparing (at 1250) the predicted aircraft path to the actual aircraft path and update prediction parameters based on the comparison. For instance, a predicted path may include predicted locations at various elapsed times. Such predicted locations may be associated with confidence coefficients or other measures of likelihood. As aircraft 140 travels along a flight path, the actual or estimated locations may be compared to the predicted locations as each elapsed time is passed. Based on the comparison, prediction parameters may be updated. As one example, where a pre-planned flight path is supplied, the weighting applied to the pre-planned path may be reduced if deviations due to weather or other factors are detected. Such prediction evaluation and update will be described in more detail in reference to process 1400 below.

Process 1200 may include generating (at 1260) a probabilistic map of potential serving antenna beams based on the predicted aircraft path and neighboring antenna beam locations. Such a map may be similar to map 1100 described above. The process may include defining (at 1270) an antenna weighting pattern based on the probabilistic map. In some embodiments, the antenna weighting pattern may simply indicate which beams to activate and/or deactivate.

Process 1200 may determine (at 1280) whether some handover criteria have been satisfied. Such handover criteria may include, for instance, link quality measurement thresholds (e.g., minimum SNR, minimum received power, etc.), where a handover is initiated if the threshold is exceeded. As another example, some embodiments may compare some measure of serving beam link quality to a measure of candidate beam link quality and perform a handover when the link quality of a candidate beam exceeds the link quality of a serving beam. In some embodiments, handover may be location-based, where, for instance, handover may be initiated when an aircraft passes a boundary between two or more beams. Some embodiments may evaluate multiple handover criteria and initiate handover when all criteria are satisfied (e.g., a location boundary may be passed, and a signal quality threshold exceeded before a handover is initiated).

If process 1200 determines (at 1280) that the handover criteria have not been satisfied, the process may repeat 1230-1280. If the process determines (at 1280) that the handover criteria have been satisfied, the process may perform (at 1290) a handover to the preferred candidate antenna beam, as identified by the handover criteria. Such a handover may include designating the preferred candidate antenna beam as the serving antenna beam and establishing an active link using the preferred candidate antenna beam. In addition, the handover may include deactivation or re-designation of the previous serving beam (e.g., by re-designating the serving beam as a candidate beam). In some embodiments, the handover may be managed by a resource such as route controller 110.

Process 1200 may include updating (at 1295) a serving beam history associated with the current flight such that the history may be utilized in future path prediction operations. Such a serving beam history may be stored in a repository associated with PPC 610 such that the serving beam history may be analyzed and used to update future predictions, as appropriate.

Figure 13:
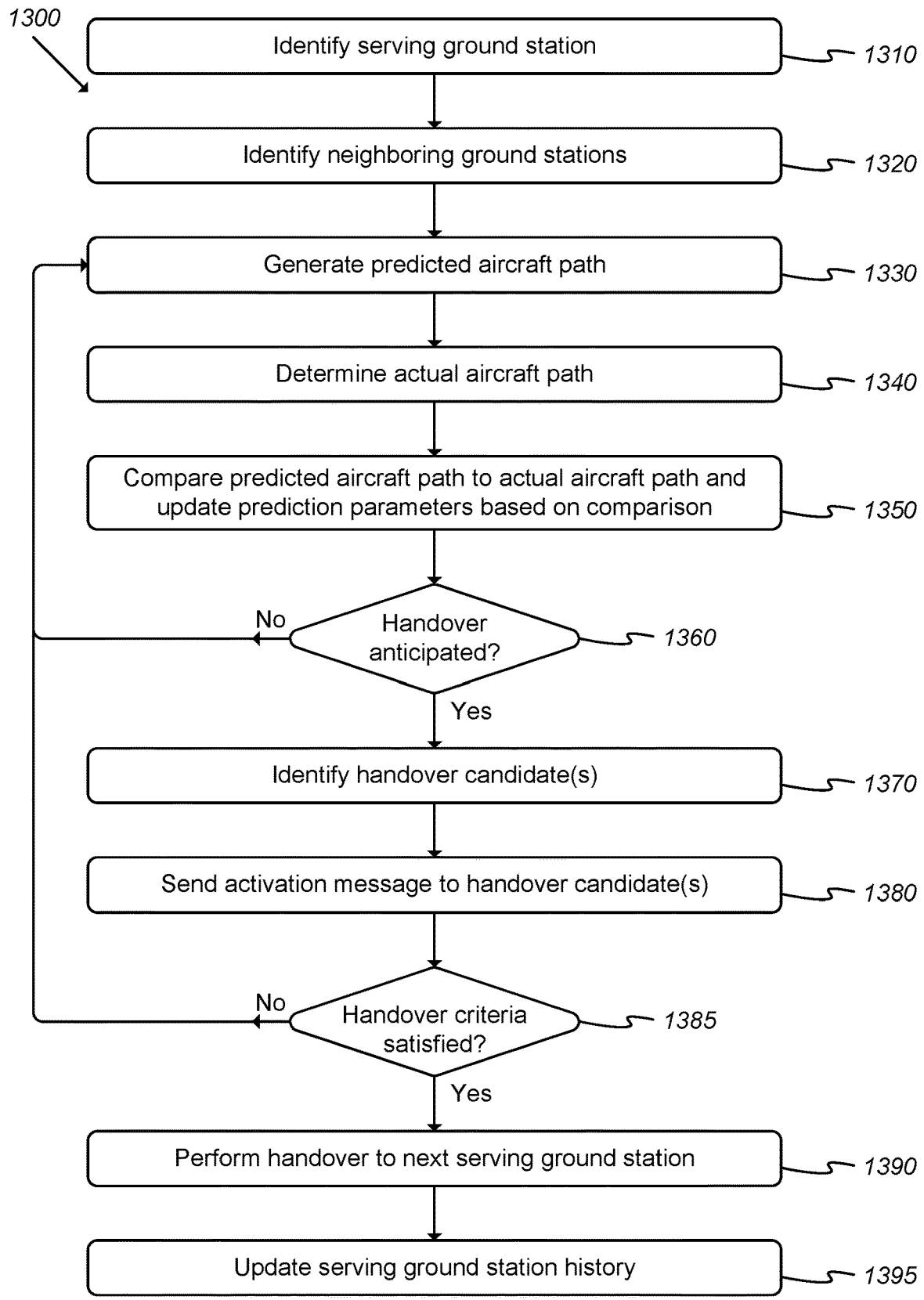
FIG. 13 illustrates an example process by which candidate ground stations may be identified and handover to a next serving ground station may be performed.

FIG. 13 illustrates an example process 1300 by which candidate ground stations may be identified and handover to a next serving ground station may be performed. As described herein, the communication channel or link between ground station and aircraft may be utilized to provide network connectivity to the aircraft and subsystems thereof. Process 1300 may be performance as an initial setup process, when a handoff to a different serving antenna beam or ground station is performed, at regular intervals during aircraft travel, and/or at other appropriate times. In some embodiments, process 1300 may be performed by route controller 110. In some embodiments, process 1300 may be performed by one or more other devices in addition to, or in lieu of, route controller 110. Furthermore, in some embodiments a complementary process may be performed by other devices, such as aircraft 140, ground station 120, etc.

As shown, process 1300 may include identifying (at 1310) a serving ground station 120. Such a serving ground station may be identified in various appropriate ways, such as by identifying a ground station associated with an active serving beam. In some embodiments, multiple candidate ground stations may be available to serve as the serving ground station. In such cases, a serving ground station may be selected from among the candidate ground stations based on some evaluation criteria (e.g., signal quality, received power level, etc.). If no evaluation criteria are available, an initial serving ground station may be selected randomly or by default.

Process 1300 may include identifying (at 1320) neighboring ground stations. Such neighboring ground stations may be identified using a look-up table, database, map, or other appropriate resource. The process may include generating (at 1330) a predicted aircraft path, determining (at 1340) an actual aircraft path, and comparing (at 1350) the predicted aircraft path to the actual aircraft path and updating prediction parameters based on the comparison. Such generating, determining, and comparing may be similar to the generating (at 1230), determining (at 1240), and comparing (at 1250) described above.

Process 1300 may include determining (at 1360) whether a handover is anticipated. Such a determination may be made in various appropriate ways. For instance, if the current location of an aircraft is within a threshold distance of a coverage area boundary, a handover may be anticipated. As another example, if the received signal quality of a serving ground station falls below a threshold, a handover may be anticipated. As another example, a handover may be anticipated when an aircraft is served by an edge beam of a current serving station (i.e., when a set of adjacent beams to the serving beam includes at least one beam from a neighboring ground station, a handover to the neighboring ground station may be anticipated).

If process 1300 determines (at 1360) that a handover is not anticipated, the process may repeat 1130-1360. If the process determines (at 1360) that a handover is anticipated, the process may identify (at 1370) one or more handover candidates. Handover candidate ground stations may be identified in various appropriate ways. For instance, if a set of candidate antenna beams has been identified, any ground station associated with a candidate antenna beam may be designated as a candidate ground station. As another example, any neighboring ground station along the predicted travel path may be identified as a candidate ground station. In some cases, such as the example of system 100, each serving station may be associated with a single candidate station (or a set of candidates) along the flight path 510 such that candidate stations are retrieved from a list based on current serving station and direction of travel along the flight path.

Process 1300 may include sending (at 1380) an activation message to each handover candidate ground station. Such a message may include, for instance, anticipated time to handover, a probabilistic map and/or beam weighting information, and/or other relevant information (e.g., path history, path prediction information, etc.). The message may be sent over a link such as an x2 link.

The process may determine (at 1385) whether some handover criteria have been satisfied. Such handover criteria may include, for instance, link quality measurement thresholds (e.g., minimum SNR, minimum received power, etc.), where a handover is initiated if the threshold is exceeded. As another example, some embodiments may compare some measure of serving ground station link quality to a measure of candidate ground station link quality and perform a handover when the link quality of a candidate ground station exceeds the link quality of a serving ground station. In some embodiments, handover may be location-based, where, for instance, handover may be initiated when an aircraft passes a boundary between two or more ground stations. Some embodiments may evaluate multiple handover criteria and initiate handover when all criteria are satisfied (e.g., a location boundary may be passed, and a signal quality threshold exceeded before a handover is initiated).

If process 1300 determines (at 1385) that the handover criteria have not been satisfied, the process may repeat 1330-1385. If the process determines (at 1385) that the handover criteria have been satisfied, the process may perform (at 1390) a handover to the preferred candidate ground station, as identified by the handover criteria. Such a handover may include designating the preferred candidate ground station as the serving ground station and establishing an active link using the preferred candidate ground station. In addition, the handover may include deactivation or re-designation of the previous serving ground station (e.g., by re-designating the serving ground station as a candidate ground station).

Process 1300 may include updating (at 1395) a serving ground station history associated with the current flight such that the history may be utilized in future path prediction operations. Such a serving beam history may be stored in a repository associated with PPC 610 such that the serving beam history may be analyzed and used to update future predictions, as appropriate.

Figure 14:
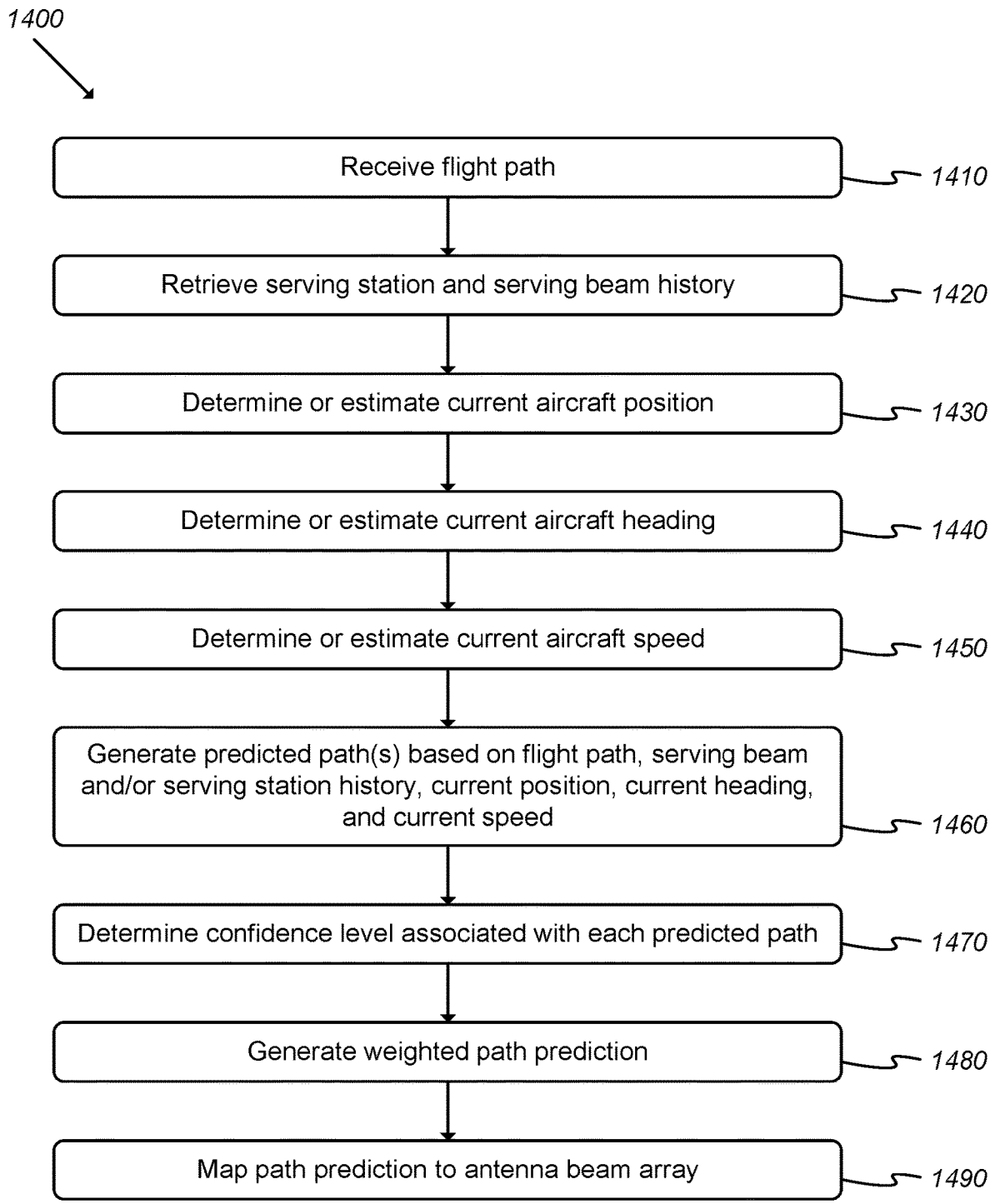
FIG. 14 illustrates an example process by which a flight path prediction may be generated and mapped to a set of ground stations and associated antenna beam array.

FIG. 14 illustrates an example process 1400 by which a flight path prediction may be generated and mapped to a set of ground stations and associated antenna beam array. As described herein, the flight path prediction may be utilized to identify candidate serving ground stations and/or candidate serving antenna beams. Process 1400 may be performance as an initial setup process, as part of process 1200 or process 1300, at regular intervals during aircraft travel, and/or at other appropriate times. In some embodiments, process 1400 may be performed by PPC 610. In some embodiments, process 1400 may be performed by one or more other devices in addition to, or in lieu of, PPC 610. Furthermore, in some embodiments a complementary process may be performed by other devices, such as aircraft 140, ground station 120, route controller 110, etc.

As shown, process 1400 may receive (at 1410) a flight path, if available. Such a flight path may be provided by aircraft 140, route controller 110, retrieved from a database or other appropriate repository, and/or otherwise received. The flight path may include a nominal or center path, a width or boundary range, target altitude and/or altitude range, and/or other appropriate information (e.g., expected flight speed at various locations along the path, wind or weather conditions along the path, etc.).

The process may include receiving (at 1420) serving beam and/or serving station history. Such historical information may be generated by processes such as process 1200 and/or process 1300 as described above. The historical information may include, for instance, a list of serving station identifiers, a list of serving beam identifiers, aircraft locations associated with serving beam or serving station usage and/or handover, time or elapsed time associated with serving beam or serving station usage and/or handover, and/or other relevant information.

Process 1400 may determine or estimate (at 1430) a current aircraft position. Such a determination may be made based on, for instance, position information provided by the aircraft (e.g., GPS coordinates), comparison of received signal strength from multiple ground stations and/or antenna beams, based on a last know position, heading, and speed of travel, and/or other appropriate ways). In some embodiments, current position may be estimated based on current (and/or historical) serving ground station location and/or current (and/or historical) serving antenna beam location or direction. Position information may include geographic location and altitude.

The process may include determining or estimating (at 1440) a current aircraft heading and may include determining or estimating (at 1450) a current aircraft speed. Heading and speed may be determined or estimated based on analysis of historical position information, data received from aircraft 140, based on analysis of serving station and/or serving beam history, and/or other appropriate ways.

Process 1400 may include generating (at 1460) one or more predicted paths based on the flight path, serving beam and/or serving station history, current position, current heading, and current speed. The prediction may assign weighting or confidence levels to each parameter. For instance, if a pre-planned flight path is available, the path prediction may rely more heavily on the pre-planned path, awareness of boundaries, etc. In contrast, if no pre-planned flight path is available, the path prediction may rely more heavily on analysis of serving beam history. As another example, if an aircraft provides actual position data, such data may be given greater weight when predicting a path than position data that is estimated based on triangulation of signals from candidate serving beams.

Some embodiments may apply machine learning or artificial intelligence to such weighting of factors and/or other elements of path prediction. For instance, as described above in relation to process 1200 and process 1300, actual paths may be compared to predicted paths and such data may be provided to PPC 610. The PPC may evaluate such predicted versus actual data in order to adjust weighting of factors and/or otherwise update path prediction algorithms.

For instance, the activation or use of particular ground stations and/or beams associated with ground stations may be used to predict which ground stations and/or beams are likely to be needed for a particular flight path. Referring to FIG. 9B, for instance, route controller 110 may receive (and/or otherwise maintain) historical information indicating that a relatively large quantity or proportion of historical flight paths included beams 1, 5, 6, 11, 12, and 16. Thus, in situations where a given aircraft has utilized beams 1, 5, and 6, route controller 110 may determine that a likelihood that beams 11, 12, and 16 will be needed for the given aircraft is relatively high. Accordingly, the weights for beams 11, 12, and 16 may be relatively high (e.g., higher in comparison to scenarios in which the aircraft did not utilize beams 1, 5, and/or 6).

Process 1400 may include determining (at 1470) a confidence level or probability associated with each predicted path and generating (at 1480) a weighted path prediction based on the predicted path(s) and associated confidence level(s). In some embodiments, rather than associating confidence levels with separate paths, a single, nominal path prediction may include an error range or other specified spread or deviation from the nominal path. For instance, some embodiments may specify a heading prediction and associated spread angle along the heading, such that the path prediction spreads out as distance increases and confidence lessens. In such cases, a confidence level or probability across the spread angle may also be defined based on deviation from the nominal path (i.e., a location closer to the nominal path may have a higher probability than a location farther from the nominal path).

The process may include mapping (at 1490) the weighted path prediction to an antenna beam array of antenna beams associated with ground stations along the path. Such mapping may include, for instance, applying predicted future aircraft location(s) to a map of beam locations in order to specify transmission power associated with each beam based on the predicted path and associated confidence level(s).

Figure 15:
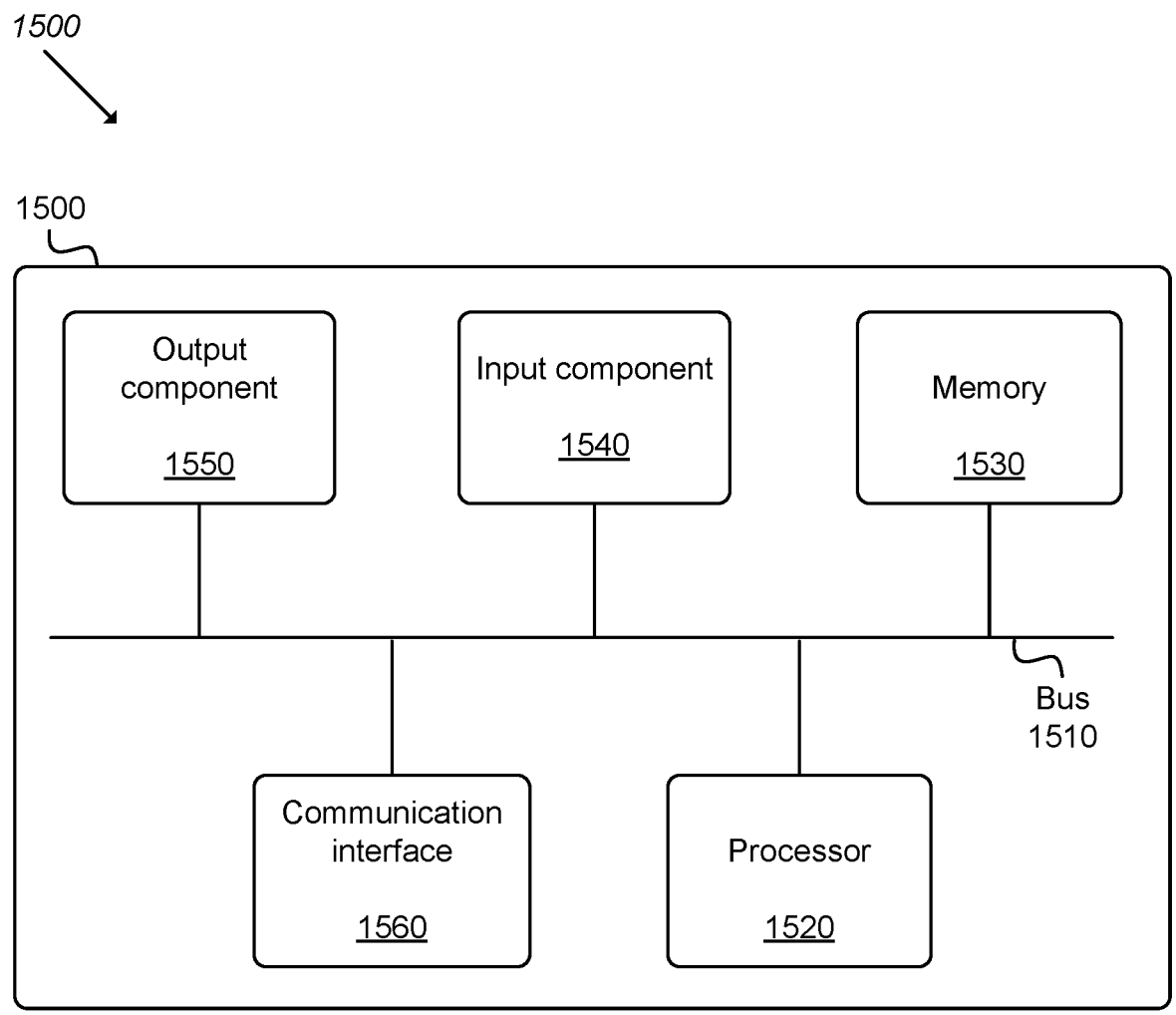
FIG. 15 illustrates example components of one or more devices, according to one or more embodiments described herein.

FIG. 15 illustrates example components of device 1500. One or more of the devices described above may include one or more devices 1500. Device 1500 may include bus 1510, processor 1520, memory 1530, input component 1540, output component 1550, and communication interface 1560. In another implementation, device 1500 may include additional, fewer, different, or differently arranged components.

Bus 1510 may include one or more communication paths that permit communication among the components of device 1500. Processor 1520 may include a processor, microprocessor, or processing logic that may interpret and execute instructions. Memory 1530 may include any type of dynamic storage device that may store information and instructions for execution by processor 1520, and/or any type of non-volatile storage device that may store information for use by processor 1520.

Input component 1540 may include a mechanism that permits an operator to input information to device 1500, such as a keyboard, a keypad, a button, a switch, etc. Output component 1550 may include a mechanism that outputs information to the operator, such as a display, a speaker, one or more light emitting diodes ("LEDs"), etc.

Communication interface 1560 may include any transceiver-like mechanism that enables device 1500 to communicate with other devices and/or systems. For example, communication interface 1560 may include an Ethernet interface, an optical interface, a coaxial interface, or the like. Communication interface 1560 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 1500 may include more than one communication interface 1560. For instance, device 1500 may include an optical interface and an Ethernet interface.

Device 1500 may perform certain operations relating to one or more processes described above. Device 1500 may perform these operations in response to processor 1520 executing software instructions stored in a computer-readable medium, such as memory 1530. A computer-readable medium may be defined as a non-transitory memory device. A memory device may include space within a single physical memory device or spread across multiple physical memory devices. The software instructions may be read into memory 1530 from another computer-readable medium or from another device. The software instructions stored in memory 1530 may cause processor 1520 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description but is not intended to be exhaustive or to limit the possible implementations to the precise form disclosed. Modifications and variations are possible in light of the above disclosure or may be acquired from practice of the implementations.

For example, while series of blocks have been described with regard to FIGS. 8 and 12-14, the order of the blocks may be modified in other implementations. Further, non-dependent blocks may be performed in parallel. Additionally, while the figures have been described in the context of particular devices performing particular acts, in practice, one or more other devices may perform some or all of these acts in lieu of, or in addition to, the above-mentioned devices.

The actual software code or specialized control hardware used to implement an embodiment is not limiting of the embodiment. Thus, the operation and behavior of the embodiment has been described without reference to the specific software code, it being understood that software and control hardware may be designed based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

Some implementations are described herein in conjunction with thresholds. To the extent that the term "greater than" (or similar terms) is used herein to describe a relationship of a value to a threshold, it is to be understood that the term "greater than or equal to" (or similar terms) could be similarly contemplated, even if not explicitly stated. Similarly, to the extent that the term "less than" (or similar terms) is used herein to describe a relationship of a value to a threshold, it is to be understood that the term "less than or equal to" (or similar terms) could be similarly contemplated, even if not explicitly stated. Further, the term "satisfying," when used in relation to a threshold, may refer to "being greater than a threshold," "being greater than or equal to a threshold," "being less than a threshold," "being less than or equal to a threshold," or other similar terms, depending on the appropriate context.

To the extent the aforementioned implementations collect, store, or employ personal information provided by individuals, it should be understood that such information shall be collected, stored, and used in accordance with all applicable laws concerning protection of personal information. Additionally, the collection, storage, and use of such information may be subject to consent of the individual to such activity (for example, through "opt-in" or "opt-out" processes, as may be appropriate for the situation and type of information). Storage and use of personal information may be in an appropriately secure manner reflective of the type of information, for example, through various encryption and anonymization techniques for particularly sensitive information.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device, comprising:
one or more processors configured to:
receive information indicating a plurality of available antenna beams associated with a plurality of ground stations that each provide wireless connectivity via one or more respective associated antenna beams;
identify a particular antenna beam, of the plurality of antenna beams, that is a serving antenna beam that is in communication with an aircraft;
identify a set of candidate antenna beams based on proximity to the serving antenna beam;
determine a predicted path of the aircraft based on identifying the serving antenna beam;
determine a likelihood, for each antenna beam of the set of candidate antenna beams, based on the predicted path and locations associated with the set of candidate antenna beams, that the predicted path will include the respective locations associated with the set of candidate antenna beams, wherein the determined likelihoods include at least:
a first likelihood that the predicted path will include a first location associated with a first antenna beam, of the set of candidate antenna beams, and
a second likelihood that the predicted path will include a second location associated with a second antenna beam, of the set of candidate antenna beams, the second likelihood being lower than the first likelihood;
determine an antenna weighting pattern based on the determined likelihoods, wherein the antenna weighting pattern includes:
a first weight based on the first likelihood, and
a second weight based on the second likelihood, wherein the second weight is lower based on the second likelihood being lower; and
cause one or more particular ground stations from among the plurality of ground stations, associated with at least the first and second antenna beams, to adjust parameters of at least the first and second antenna beams based on the antenna weighting pattern.

2. The device of claim 1, wherein determining the antenna weighting pattern includes specifying transmission power for the one or more candidate antenna beams.

3. The device of claim 1, wherein the serving antenna beam is a first antenna beam, wherein the one or more processors are further configured to:
determine a first link quality of an active communication link with the aircraft via the first antenna beam;
determine a second link quality of a communication link with the aircraft via a second antenna beam, the second antenna beam being a particular antenna beam of the set of candidate antenna beams;
determine whether the second link quality is greater than the first link quality;
perform a handover, of communications with the aircraft, from the serving antenna beam to the particular candidate serving antenna beam when determining that the second link quality is greater than the first link quality; and
utilize the first antenna beam as the serving antenna beam when determining that the second link quality is not greater than the first link quality.

4. The device of claim 3, wherein the aircraft is a first aircraft, wherein the predicted path is a first predicted path, wherein the one or more processors are further configured to:
update a serving antenna beam history to indicate that the first and second antenna beams were used to communicate with the first aircraft;
determine that a second aircraft is in communication with the first antenna beam;
determine, based on the updated serving antenna beam history, that a second predicted path associated with the second aircraft, will include a location associated with the second antenna beam.

5. The device of claim 1, wherein the one or more processors are further configured to adjust parameters of the one or more candidate antenna beams based on the antenna weighting pattern by:
setting a transmission power of each candidate antenna beam based on a weight associated with each candidate antenna beam.

6. The device of claim 1, wherein the one or more processors are further configured to:
determine a link quality of an active communication link with the aircraft via the serving antenna beam; and
adjust antenna gain to achieve a target link quality.

7. The device of claim 1, wherein executing the one or more processors are further configured to deactivate at least one ground station from among the plurality of ground stations based on the predicted path.

8. A non-transitory computer-readable medium, storing a set of processor-executable instructions to:
receive information indicating a plurality of available antenna beams associated with a plurality of ground stations that each provide wireless connectivity via one or more respective associated antenna beams;
identify a particular antenna beam, of the plurality of antenna beams, that is a serving antenna beam that is in communication with an aircraft;
identify a set of candidate antenna beams based on proximity to the serving antenna beam;
determine a predicted path of the aircraft based on identifying the serving antenna beam;
determine a likelihood, for each antenna beam of the set of candidate antenna beams, based on the predicted path and locations associated with the set of candidate antenna beams, that the predicted path will include the respective locations associated with the set of candidate antenna beams, wherein the determined likelihoods include at least:

a first likelihood that the predicted path will include a first location associated with a first antenna beam, of the set of candidate antenna beams, and a second likelihood that the predicted path will include a second location associated with a second antenna beam, of the set of candidate antenna beams, the second likelihood being lower than the first likelihood;

determine an antenna weighting pattern based on the determined likelihoods, wherein the antenna weighting pattern includes:

a first weight based on the first likelihood, and a second weight based on the second likelihood, wherein the second weight is lower based on the second likelihood being lower; and cause one or more particular ground stations from among the plurality of ground stations, associated with at least the first and second antenna beams, to adjust parameters of at least the first and second antenna beams based on the antenna weighting pattern.

9. The non-transitory computer-readable medium of claim 8, wherein the set of processor-executable instructions, to determine the antenna weighting pattern, include processor-executable instructions to specify transmission power for the one or more candidate antenna beams.

10. The non-transitory computer-readable medium of claim 8, wherein the serving antenna beam is a first antenna beam, wherein executing the set of processor-executable instructions further causes the one or more processors to:

determine a first link quality of an active communication link with the aircraft via the first antenna beam;

determine a second link quality of a communication link with the aircraft via a second antenna beam, the second antenna beam being a particular antenna beam of the set of candidate antenna beams;

determine whether the second link quality is greater than the first link quality;

perform a handover, of communications with the aircraft, from the serving antenna beam to the particular candidate serving antenna beam when determining that the second link quality is greater than the first link quality; and utilize the first antenna beam as the serving antenna beam when determining that the second link quality is not greater than the first link quality.

11. The non-transitory computer-readable medium of claim 10, wherein the aircraft is a first aircraft, wherein the predicted path is a first predicted path, wherein executing the set of processor-executable instructions further causes the one or more processors to:

update a serving antenna beam history to indicate that the first and second antenna beams were used to communicate with the first aircraft;

determine that a second aircraft is in communication with the first antenna beam;

determine, based on the updated serving antenna beam history, that a second predicted path associated with the second aircraft, will include a location associated with the second antenna beam.

12. The non-transitory computer-readable medium of claim 8, wherein executing the set of processor-executable instructions further causes the one or more processors to adjust parameters of the one or more candidate antenna beams based on the antenna weighting pattern by:

setting a transmission power of each candidate antenna beam based on a weight associated with each candidate antenna beam.

13. The non-transitory computer-readable medium of claim 8, wherein executing the set of processor-executable instructions further causes the one or more processors to:

determine a link quality of an active communication link with the aircraft via the serving antenna beam; and adjust antenna gain to achieve a target link quality.

14. The non-transitory computer-readable medium of claim 8, wherein executing the set of processor-executable instructions further causes the one or more processors to deactivate at least one ground station from among the plurality of ground stations based on the predicted path.

15. A method, comprising:

receiving information indicating a plurality of available antenna beams associated with a plurality of ground stations that each provide wireless connectivity via one or more respective associated antenna beams;

identifying a particular antenna beam, of the plurality of antenna beams, that is a serving antenna beam that is in communication with an aircraft;

identifying a set of candidate antenna beams based on proximity to the serving antenna beam;

determining a predicted path of the aircraft based on identifying the serving antenna beam;

determining a likelihood, for each antenna beam of the set of candidate antenna beams, based on the predicted path and locations associated with the set of candidate antenna beams, that the predicted path will include the respective locations associated with the set of candidate antenna beams, wherein the determined likelihoods include at least:

a first likelihood that the predicted path will include a first location associated with a first antenna beam, of the set of candidate antenna beams, and a second likelihood that the predicted path will include a second location associated with a second antenna beam, of the set of candidate antenna beams, the second likelihood being lower than the first likelihood;

determining an antenna weighting pattern based on the determined likelihoods, wherein the antenna weighting pattern includes:

a first weight based on the first likelihood, and a second weight based on the second likelihood, wherein the second weight is lower based on the second likelihood being lower; and causing one or more particular ground stations from among the plurality of ground stations, associated with at least the first and second antenna beams, to adjust parameters of at least the first and second antenna beams based on the antenna weighting pattern.

16. The method of claim 15, wherein determining the antenna weighting pattern comprises specifying transmission power for the one or more candidate antenna beams.

17. The method of claim 15, wherein the serving antenna beam is a first antenna beam, the method further comprising:

determining a first link quality of an active communication link with the aircraft via the first antenna beam;

determining a second link quality of a communication link with the aircraft via a second antenna beam, the second antenna beam being a particular antenna beam of the set of candidate antenna beams;

determining whether the second link quality is greater than the first link quality;

performing a handover, of communications with the aircraft, from the serving antenna beam to the particular candidate serving antenna beam when determining that the second link quality is greater than the first link quality; or utilizing the first antenna beam as the serving antenna beam when determining that the second link quality is not greater than the first link quality.

18. The method of claim 17, wherein the aircraft is a first aircraft, wherein the predicted path is a first predicted path, the method further comprising:

updating a serving antenna beam history to indicate that the first and second antenna beams were used to communicate with the first aircraft;

determining that a second aircraft is in communication with the first antenna beam;

determining, based on the updated serving antenna beam history, that a second predicted path associated with the second aircraft, will include a location associated with the second antenna beam.

19. The method of claim 15 further comprising adjusting parameters of the one or more candidate antenna beams based on the antenna weighting pattern by setting a transmission power of each candidate antenna beam based on a weight associated with each candidate antenna beam.

20. The method of claim 15, further comprising deactivating at least one ground station from among the plurality of ground stations based on the predicted path.

* * * * *